Dec. 28, 1954 L. L. VERKUIL ET AL 2,698,354
CONSTRUCTION FOR ELECTRICAL CONNECTIONS
IN ELECTRIC SIGNALING APPARATUS
Original Filed Oct. 30, 1950 8 Sheets-Sheet 3

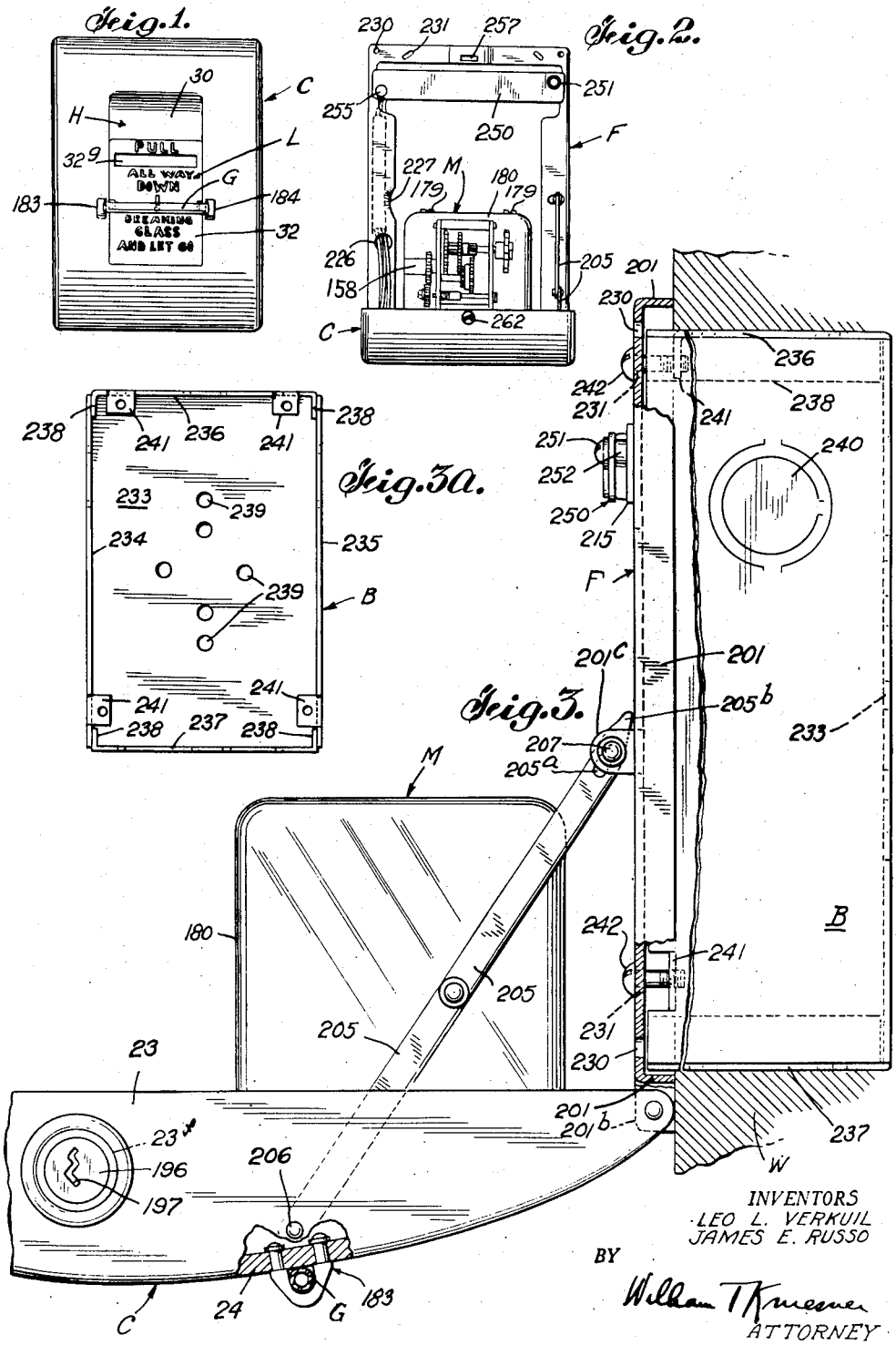

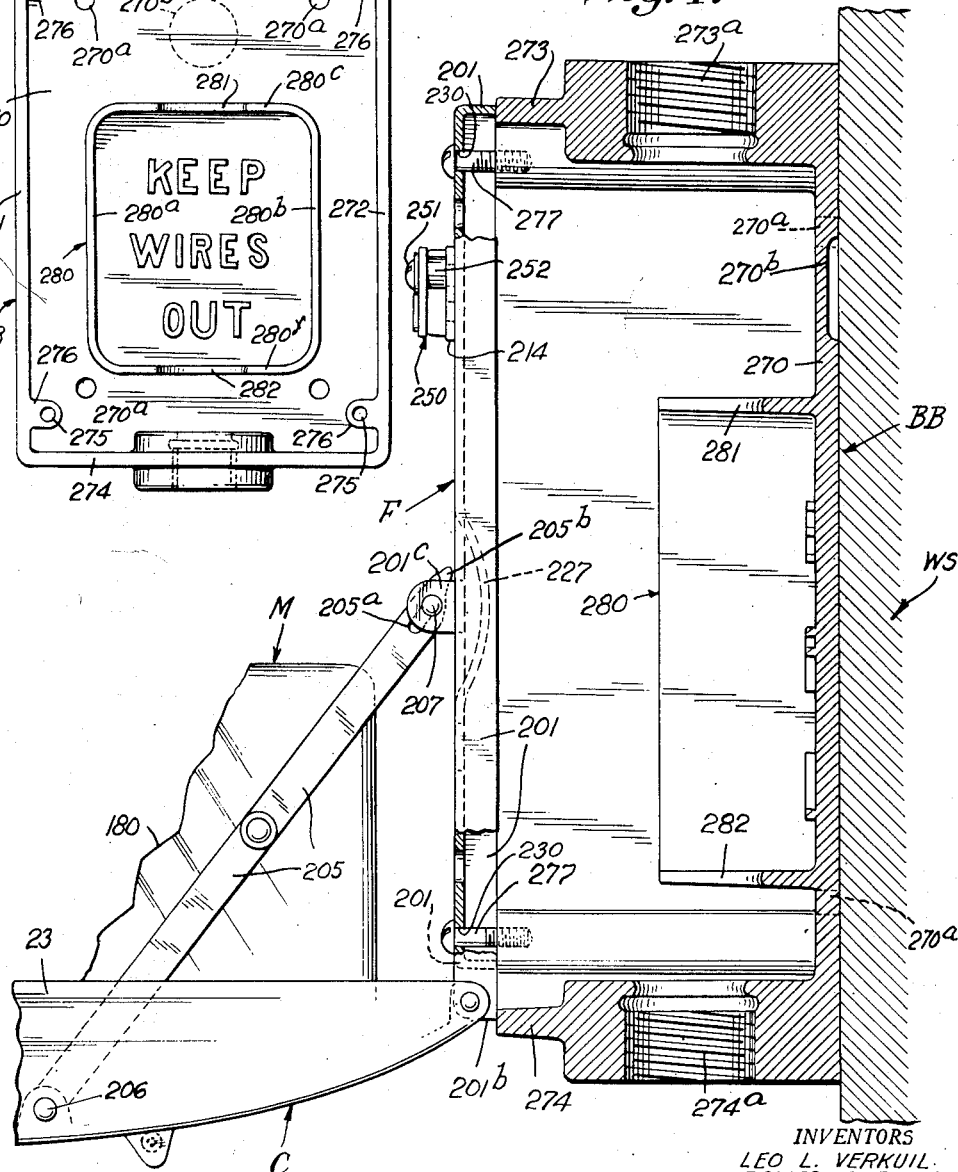

INVENTORS
LEO L. VERKUIL
JAMES E. RUSSO
BY
William T. Kueman
ATTORNEY

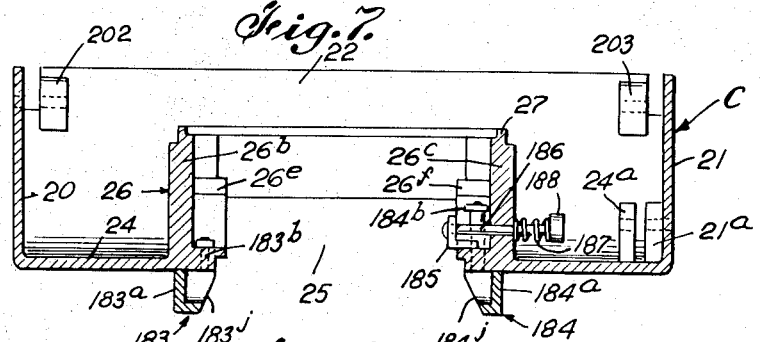
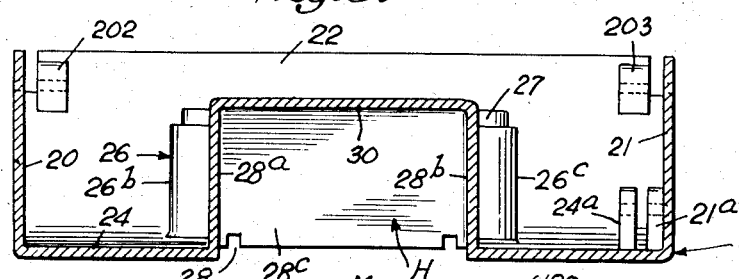
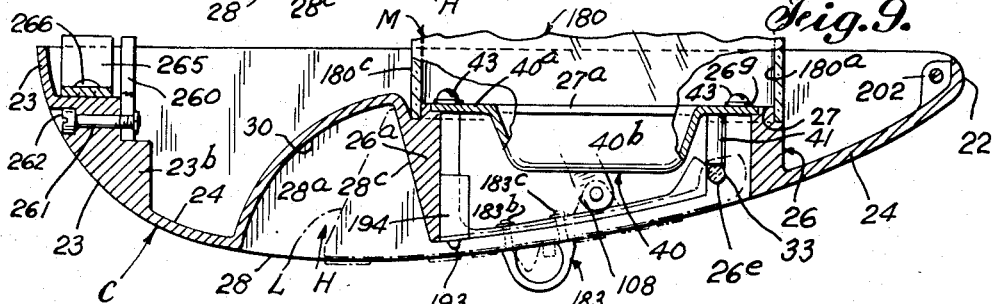
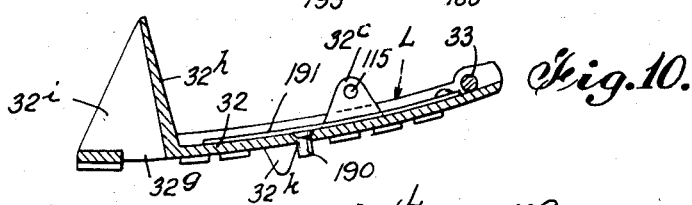
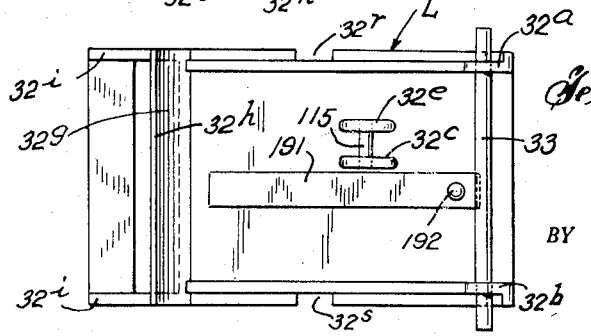
INVENTORS
LEO L. VERKUIL
JAMES E. RUSSO
BY
ATTORNEY Dec. 28, 1954  L. L. VERKUIL ET AL  2,698,354
CONSTRUCTION FOR ELECTRICAL CONNECTIONS
IN ELECTRIC SIGNALING APPARATUS
Original Filed Oct. 30, 1950  8 Sheets-Sheet 5

INVENTORS
LEO L. VERKUIL
JAMES E. RUSSO
BY
William T. Kremer
ATTORNEY

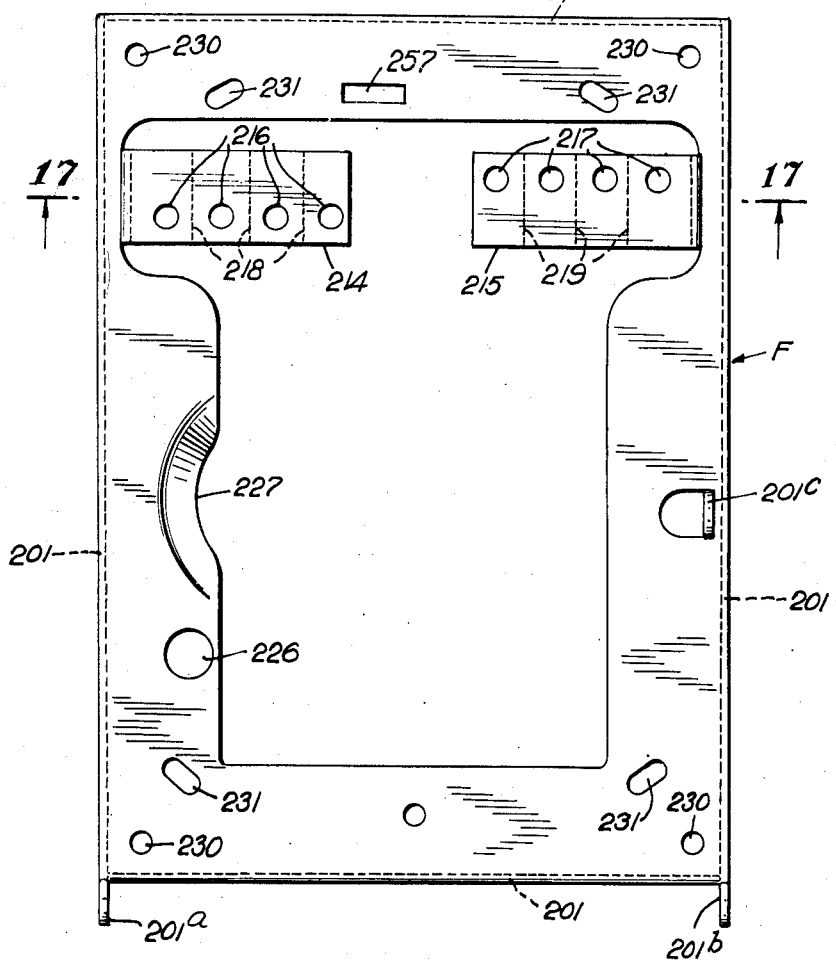
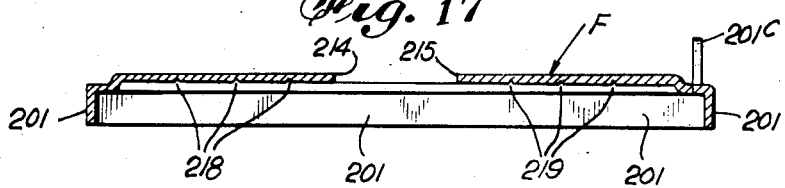

INVENTORS
LEO L. VERKUIL
JAMES E. RUSSO
BY William T. Kraemer
ATTORNEY

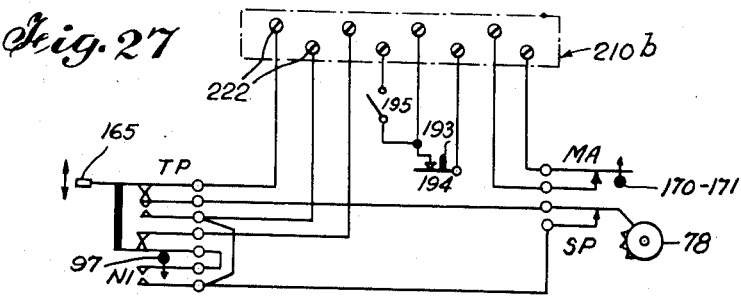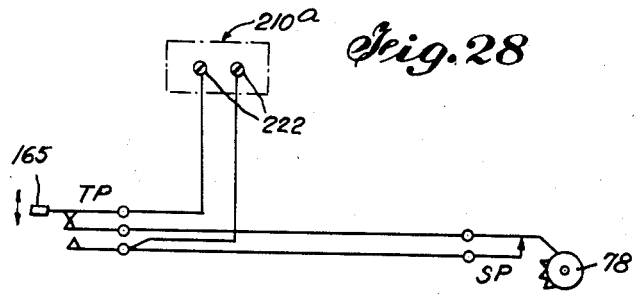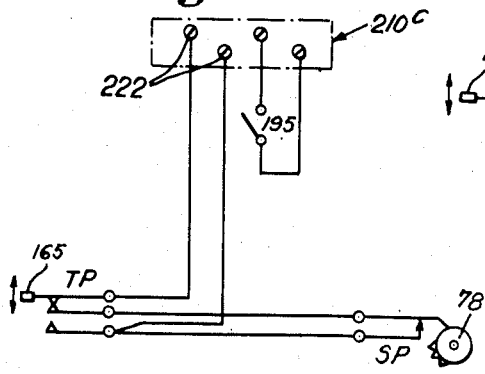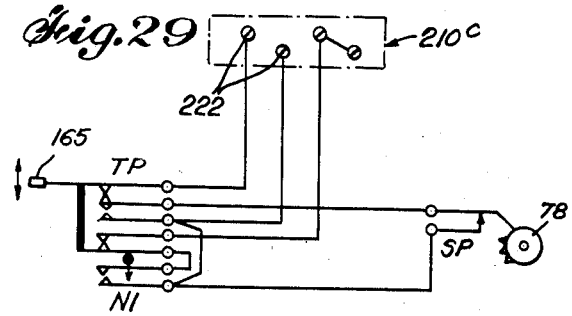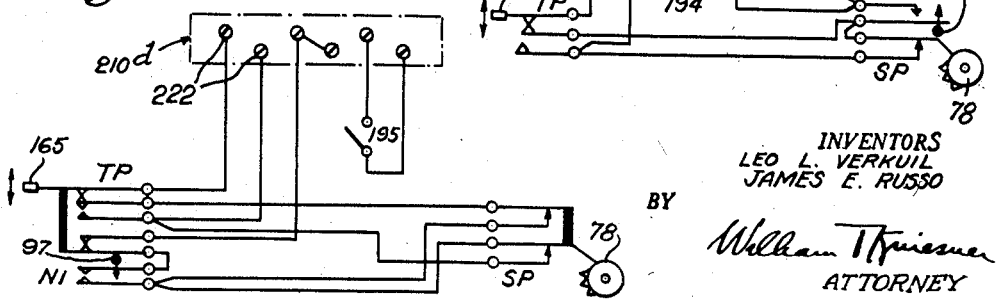

United States Patent Office 2,698,354
Patented Dec. 28, 1954

2,698,354

CONSTRUCTION FOR ELECTRICAL CONNECTIONS IN ELECTRIC SIGNALING APPARATUS

Leo L. Verkuil and James E. Russo, Norwalk, Conn., assignors to Edwards Company, Inc., Norwalk, Conn., a corporation of New York Original application October 30, 1950, Serial No. 192,977, now Patent No. 2,594,369, dated April 29, 1952. Divided and this application April 25, 1952, Serial No. 284,248

23 Claims. (Cl. 174—59)

This invention relates to electrical signalling apparatus and installations, more particularly to the electrical connections thereof, as in fire alarm or call stations where a wide range of varying requirements have to be met.

This application is a division of our application Serial No. 192,977, now Patent No. 2,594,369 filed October 30, 1950.

One of the objects of this invention is to provide a compact and flexible construction for electrically connecting up and installing signalling and other electrical apparatus or devices, that will be well adapted to meet widely varying requirements. Another object is to provide a construction of the above-mentioned character so arranged as to facilitate manufacture and the electric assembly or connections thereof, and also to simplify and facilitate installation, particularly where the physical conditions for installation may differ or vary. Another object is to provide a method and construction for electrically connecting up signalling apparatus in a unitary, compact, and foolproof entity so constructed and so capable of assembly or modification that a wide variety of the requirements of practical use may be readily met and installation for actual use facilitated.

Another object is to provide, in signalling apparatus of the above-mentioned character, sub-unit structures or sub-assemblies that will facilitate manufacture and assembly and which, while embodying substantially similar or identical parts throughout, have features of construction permitting a substantial range of flexibility of ready adaptation to meet varying requirements of practical use and which are constructed for ease and facility of assembly thereto of parts which vary in dimensions or in number, or both, according to the particular requirements to be met. Another object is to provide, in an apparatus of the just-mentioned character, a system and means for efficiently making electrical connections, both for assembly purposes and for ultimate installation purposes, as for wiring up the sub-unit or sub-assembly, even though the number of signalling or other electrical devices may vary widely in number, and as for making circuit connections thereto in completing an installation. Another object is to provide a terminal block construction and assemblage thereof to a signalling apparatus or to a sub-unit thereof by which a substantial range of varying requirements may be readily and inexpensively met in the course of fabrication and by which such compactness and interrelationship of parts are achieved as to facilitate packaging and shipment and final installation.

Another object is to provide in apparatus of the above-mentioned character, a construction for terminal-carrying insulating blocks and a mounting therefor in which the terminal block may be readily and inexpensively dimensioned or suited to the particular need or number of connector elements to be employed, all while maintaining dependable and safe insulation between connecting or connector elements as well as simplicity and ease of assembly. Another object is to provide a combined support for signalling devices and an installation mounting therefor in which a terminal connector block is embodied to form therewith a compact sub-unit or sub-assembly well adapted for handling and shipment and adapted for simplicity and ease of ultimate installation; another object is to carry out this last-mentioned object by way of coacting elements which include the terminal block and the mounting so constructed that while the terminal block is made readily accessible for initial wiring up and for ultimate installation purposes, it is well protected, in the sub-assembly, against the hazards of handling, packing, or shipment of the subassembly. Another object is to provide, in constructions of the just-mentioned nature, inexpensive and efficient means for readily accommodating the terminal block and its mounting to differing dimensions of terminal block according to the required number of connector elements to be associated with it. Another object is to provide, in an apparatus of the just-mentioned character, a mounting member so constructed that it may be readily and inexpensively stamped out of sheet metal and readily adapted to the varying requirements imposed by the number of connector elements of the connector block carried thereby.

Other objects will be in part obvious or in part pointed out hereinafter.

The invention accordingly consists in the features of construction, combinations of elements, and arrangement of parts, all as will be illustratively described herein, and the scope of the application of which will be indicated in the following claims.

In the accompanying drawings, in which are shown by way of illustration several of the various possible embodiments of this invention and in which similar reference characters refer to similar parts throughout:

Figure 1 is a front elevation of an installation illustratively in the form of a fire alarm box or signalling station, as it appears when installed and ready for use;

Figure 2 is a front elevation thereof as it appears when opened, as for testing, inspection, etc., certain parts being omitted;

Figure 3 is a side elevation as seen from the right in Figure 2, partly in section and partly broken away, illustrating a wall-recessed installation;

Figure 5:
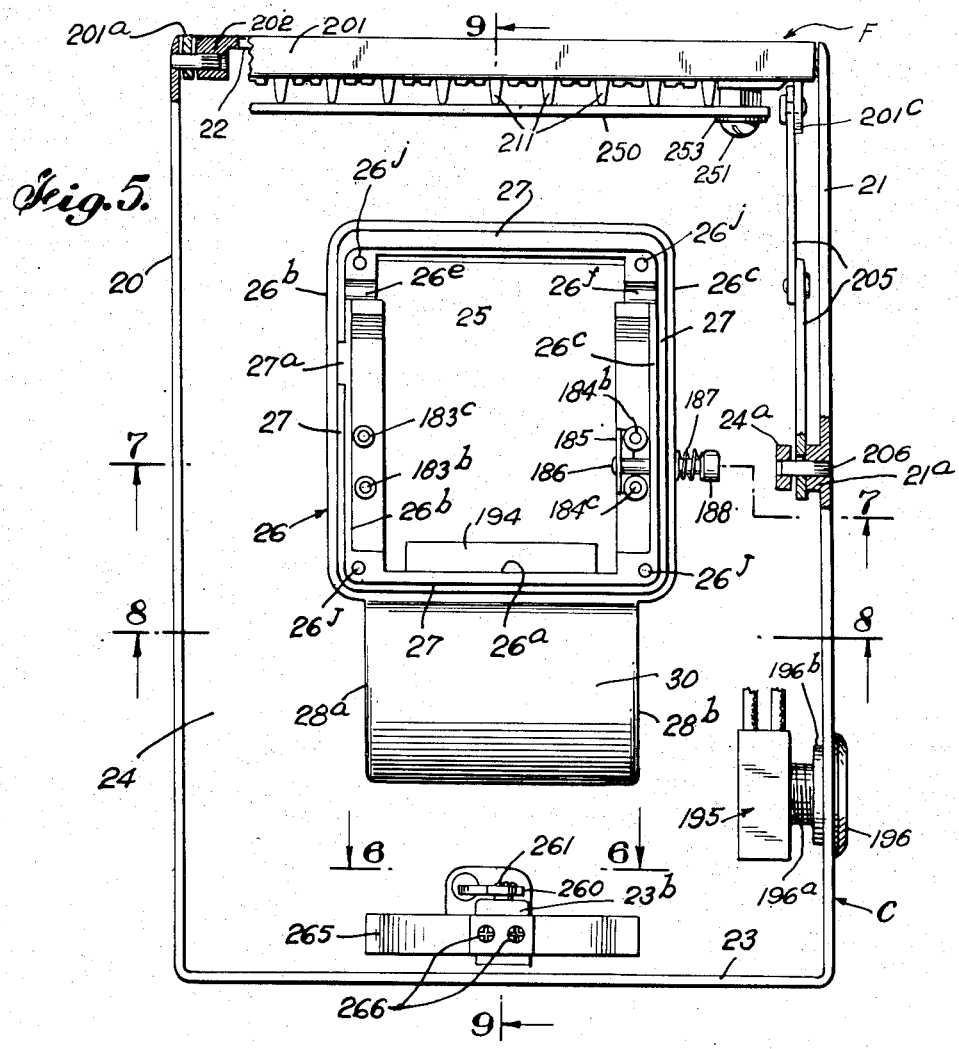
Figure 6:
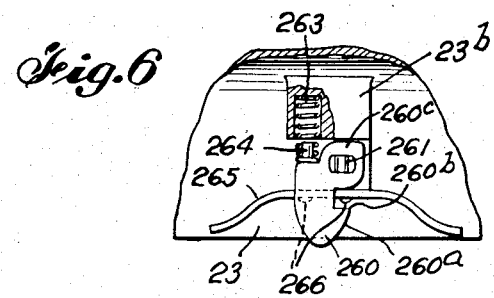
Figure 13:
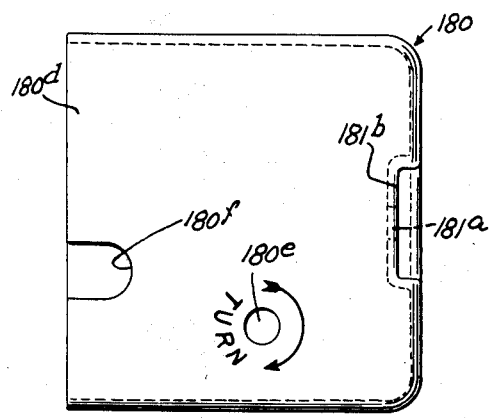
Figure 12:
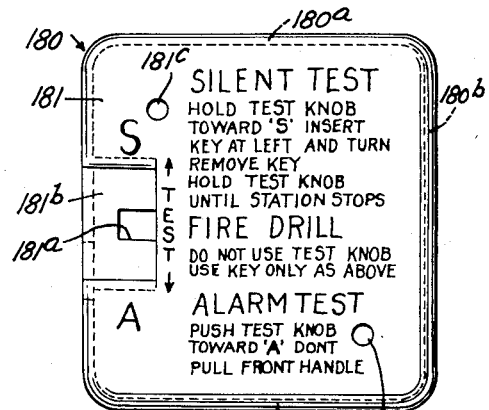
Figure 14:
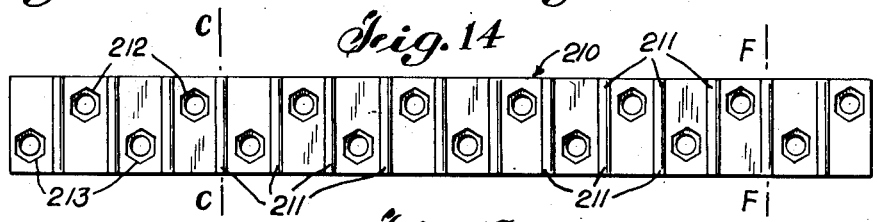
Figure 15:
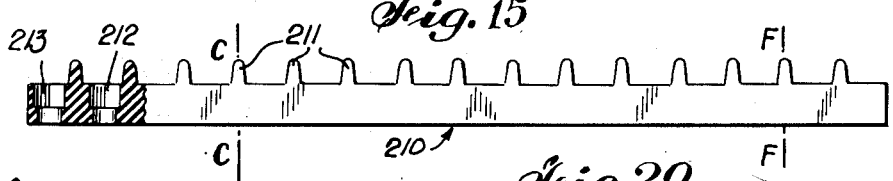
Figure 18:
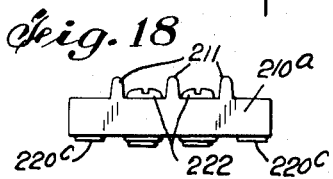
Figure 19:
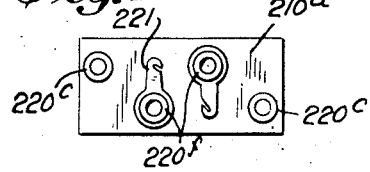
Figure 20:
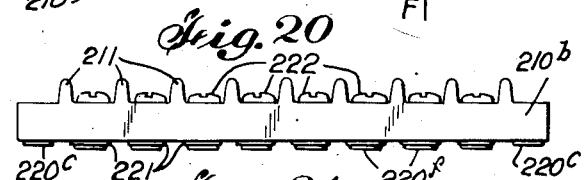
Figure 21:
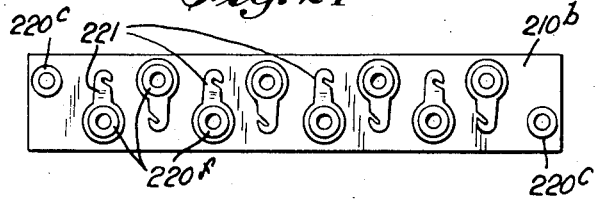
Figure 22:
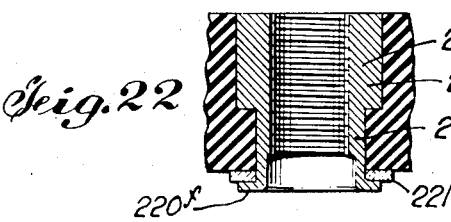
Figure 23:
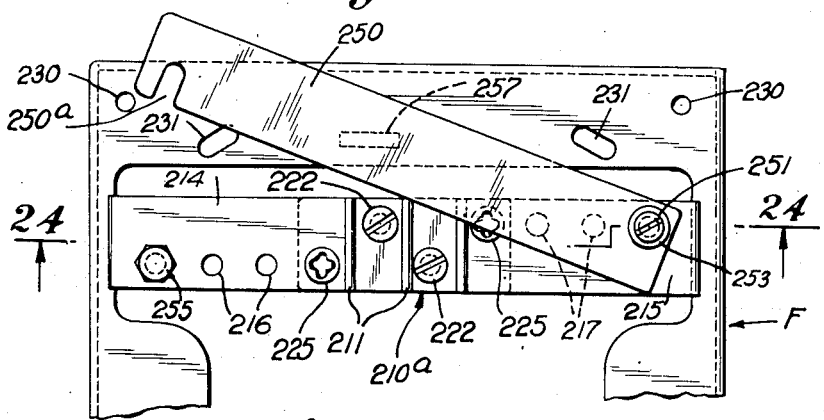
Figure 24:
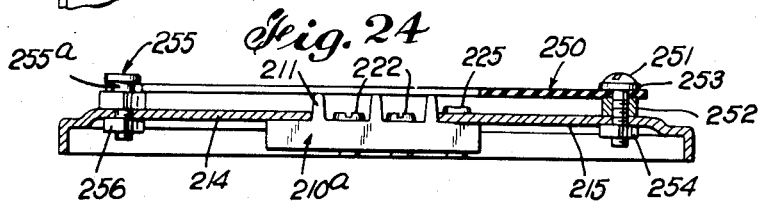
Figure 25:
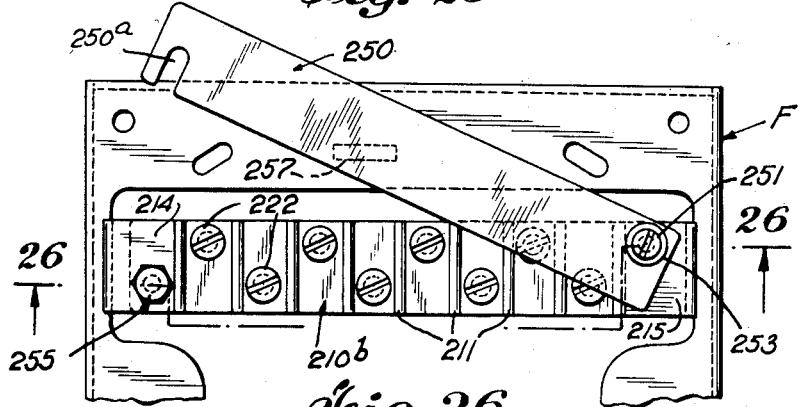
Figure 26:
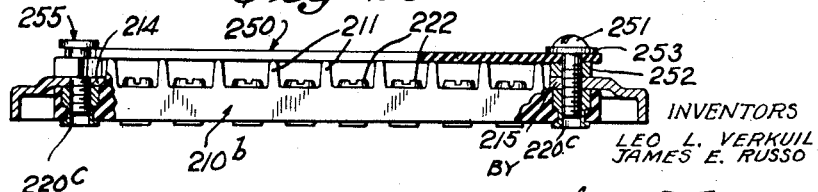

Figure 3ª is a front view, on a greatly reduced scale, of the wall-recessed casing part of the installation of Figure 3;

Figure 4 is an elevation as seen from the right in Figure 2, partly in section and partly broken away, illustrating a surface-mounted installation, with certain other parts that are duplications of parts shown in Figure 3 being also broken away;

Figure 4ª is a front view, on a greatly reduced scale, of the surface-mounted casing part of the installation of Figure 4;

Figure 5 is a plan view as seen from the top in Figure 2, certain parts being broken away or omitted and others shown in horizontal section, showing in particular two of the several electrical devices that are to be connected up;

Figure 6 is a detached elevation as seen along the line 6—6 of Figure 5, showing certain details, partly in section, of a latch construction;

Figure 7 is a transverse vertical sectional view of the front casing part as seen on the line 7—7 of Figure 5;

Figure 8 is a transverse vertical sectional view of the front casing part as seen along the line 8—8 of Figure 5, certain parts being omitted;

Figure 9 is a central longitudinal sectional view of the front casing part as seen along the line 9—9 of Figure 5, certain parts being omitted;

Figure 10 is a central longitudinal sectional view of the hand lever as detached from Figure 9 and also as seen along the line 9—9 of Figure 5, showing also certain switch-actuating parts;

Figure 11 is a detached rear elevation of the manual or hand lever of Figure 10 as it is seen from above in Figure 10;

Figure 12 is a detached top or plan view of a transparent box-like enclosure for the signal-transmitting mechanism as seen from above in Figure 2;

Figure 13 is a side elevation as seen from the left in Figure 12;

Figure 14 is a plan view of a length of preformed insulating bar for making terminal blocks;

Figure 15 is a front elevation thereof as seen from the bottom in Figure 14;

Figure 16 is a plan view of a frame plate before assembly to it of other parts;

Figure 17 is a transverse sectional view as seen on the line 17—17 of Figure 16;

Figures 18 and 20 are front elevations, and Figures 19 and 21 are, respectively, bottom elevations, of two illustratively different lengths of terminal block assemblies as prepared for assembly to the frame of Figure 16;

Figure 22 is a detached cross-sectional view on an enlarged scale showing certain features of construction of the terminal blocks of Figures 18–21;

Figure 23 is a fragmentary front elevation of the frame of Figure 16 with a short terminal block and other parts assembled thereto;

Figure 24 is a transverse sectional view along the line 24—24 of Figure 23;

Figure 25 is a fragmentary front elevation of the frame of Figure 16 with a long terminal block and other parts assembled thereto;

Figure 26 is a transverse sectional view as seen along the line 26—26 of Figure 25; and Figures 27–32 are circuit diagrams showing illustratively several of the many possible electrical combinations and circuit arrangements of the apparatus.

There are widely varying or different conditions which have to be met in, illustratively, fire alarm signalling stations, depending upon which, and how many, are called for; these in turn are affected by such factors as the location of the particular fire alarm station or stations, the type of circuit or system with which it is to be associated, the type of audible or other signalling device that is to be actuated and whether local or remote, facility of access for inspection or for testing either of the mechanism in the station or of the signal transmission, or both, facility to sound a local drill alarm signal without sounding the central station alarm, telltale signalling of tampering, non-interfering controls, deterrents to malicious operation of the station, external foolproof construction, and others. Of these illustrative and numerous requirements, only a few are met with, for example, in certain types of installations, and others or more are met with in other types of installations, and thus a wide variety of combinations of such requirements have to be fulfilled. For example, a fire alarm system installed in a school building should meet the requirement that the central station alarm and local alarms be sounded from any of the stations distributed throughout the school building, while for purposes of fire drills the local alarm only is to be sounded and no alarm transmitted to the central station. Even in such an illustrative case various other requirements have to be met, such as deterrents to malicious tampering, and facility for inspection, testing, and the like.

Accordingly the number of conductors in the signalling station itself may vary widely as may also the number of building-circuit conductors to which the station is to be connected upon installation. It is one of the dominant aims of this invention to facilitate meeting, in an efficient and inexpensive manner, such varying requirements for electrical connections, both for purposes of initial assembly or manufacture and for ultimate purposes of installation, and embodiment into an over-all signalling system and its circuits.

Indicated in the drawings are sub-units or sub-assemblies comprising a casing or closure part C, a companion casing or enclosure part B which is preferably in the form of a so-called outlet box that can be recessed into a wall, an alternative companion casing or enclosure part BB in the form of a box mounted on the face of a wall or other support, a frame, and connector panel sub-assembly F which also coacts to correlate the parts C and B or the parts C and BB to form a complete enclosure for the code signal transmitting mechanism which, in the drawings, is indicated at M, also in the form of a sub-assembly that is correlated to the closure part C, all as later described; these sub-assemblies may include added sub-units or interchangeable sub-units, according to the particular specification or requirement to be met. For example, sub-assembly C may include a sub-unit L in the form of a manual operating lever carried by the closure part C for coacting with the latter and with the code mechanism M, and it is constructed or assembled to coact with still other parts where such are required in the system, as is later described.

The casing part C, which may be a casting, is preferably relatively shallow, whereas the companion casing part B (Figure 3) is preferably of relatively substantial depth so that when set into a recess in a wall, substantially only the casing part C projects forwardly from the face of the wall surfacing. In some installations recessing into a wall is not practical or may be undesired, and in such case companion casing part BB (Figure 4), constructed to be secured to the face of a wall or other support, is associated with the same shallow casing part C; it is of substantial depth and coacts with part C, as is later described.

Casing part C has a perimeter formed by opposed parallel side walls 20 and 21 (Figures 5, 7, 8, and 9) and curved or inclined top and bottom walls 22 and 23, the latter merging, by appropriate curvatures, into a front wall 24, being in vertical cross-section externally convex and internally concave.

As is better shown in Figure 5, walls 20, 21, 22, and 23 of casing part C form a rectangular outline and when the part C is in horizontal position with the front wall 24 bottom-most, these walls enclose a generally rectangular space which, where the front wall 24 is curved or inclined, is of varying depth (Figure 9). Adjacent but spaced from the inner end wall 22 and spaced also from the side walls 20 and 21, there is a relatively large aperture 25 (Figures 5 and 9) in the front wall 24; it may be rectangular or square in shape (Figure 5) and is surrounded by a correspondingly shaped wall, generally indicated by the reference character 26, that stands up (Figures 7 and 9) from the front wall 24 about the periphery of the aperture 25 and that is preferably cast integrally with front wall 24, forming in effect a well that is open at both ends. The four side portions of wall 26 terminate in a plane (see Figures 7 and 9) somewhat below the plane of the edges of casing walls 20, 22, 21, and 23; they are preferably of substantial thickness, and upstanding from their upper continuous edge face (as seen in Figures 5 and 7) is a peripherally continuous locating rib or flange 27, for purposes later described. As shown, this arrangement provides a substantially continuous ledge both to the inside and to the outside of the rib 27. It is to the casing part C that the signalling elements, which may vary in number and kind as above noted, are to be assembled according to the particular requirements.

As is better shown in Figures 5, 8, and 9, there is another opening 28 in front wall 24 which, as seen in the front face of wall 24 (see Figure 1), substantially matches the width of aperture 25 and appears somewhat as an upward extension of the latter, but it is separated from well opening 25 by the transverse wall 26a; it is laterally bounded by walls 28a and 28b which are substantially in line with the opposed walls 26b and 26c of the well 26, being in effect integral extensions of the latter, and it is closed off by a curved wall 30, as is better shown in Figure 9. There is thus formed a finger or hand hole, for convenience designated by reference character H, which is open and accessible only from the front face of the front wall 24, somewhat near the upper portion thereof (see Figures 1 and 9).

The well aperture 25 in front wall 24 is closed off at its outer end by the manual operating lever sub-assembly L (Figures 1, 10, and 11) which is in the form of a cast plate-like lever 32, generally rectangular in shape and provided at its lower inside face with spaced ears 32a and 32b apertured to receive a pivot pin 33, the ends of which are seated in recesses 26e and 26f provided in side walls 26b and 26c of the well 26 (see Figure 9). These recesses are open-ended toward the interior of casing part C, being thus somewhat like slots, so that with pivot shaft or pin 33 initially assembled to the plate 32 and with its ends projecting laterally from the plate lever 32, these ends can be entered into these slot-like recesses 26e and 26f from their above-mentioned open ends, which are subsequently closed off in a manner later described. The plate-like lever 32 extends beyond the well wall 26a to overlie and partially close off the hand hole H, but it terminates sufficiently away from curved or concave wall 30 (Figure 1) so as to provide ample space in a vertical direction to permit free entry of two or more fingers of the hand into the hand hole H and, guided by the curved face of back wall 30, to take or reach behind the upper end of the lever plate 32 so that the latter may be pulled and swung away and downwardly from the front wall 24, about the pin or shaft 33 as a pivoting axis. On its front face it may bear appropriate legends of instruction, as suggested in Figure 1. By such movement of the lever plate 32 the alarm is to be sounded at the central station.

Lever 32 actuates or coacts with various parts including a code transmitting mechanism M, shown in Figure 2 through the transparent housing 180; it is preferably constructed as a sub-assembly as described in our parent application to be seated, as a single unit, against the continuous edge face of the walls of well 26 and within the above-mentioned locating flange 27 which thus serves to readily position the sub-assembly M for securing it in place and in relation to other coacting parts including the plate lever 32. The code transmitting mechanism includes a mechanical motor, the driving energy for which is derived from a wound spring, carried on a base or mounting plate 40 (Figure 9), preferably in the form of a sheet metal stamping, shaped to provide a flat peripheral flange 40$^a$ which is substantially rectangular and dimensioned to neatly fit within the locating flange 27 and to rest peripherally against the inside ledge or edge face of walls 26, as is better shown in Figure 9; at its corners it has holes through which are passed screws 43 (Figure 9) threaded into four corner holes 26$^j$ (Figure 5) of well walls 26, thus detachably securing the base plate 40 and the mechanism carried by it to the front casing part C.

The mounting plate 40 is dished as at 40$^b$ to extend into the well and toward the plane of front wall 24 of the casing part C (Figure 9); it thus serves also to substantially close off the outer end of the well aperture 25, adjacent the inner face of the plate lever 32, so that when the latter is swung about its pivoting shaft 33, a movement which somewhat uncovers that end of the well, access to the interior of the casing is barred.

Plate 40, adjacent its two right-hand corners (as viewed in Figure 9) and in the flat marginal portion 40$^a$ thereof, has secured to it two posts 41 which, when plate 40 with the code mechanism is set in place as above described, project toward the front wall 24 of casing part C; they are spaced and dimensioned to enter and close off the slot-like rear ends of the bearing recesses 26$^e$ and 26$^f$ (Figures 5, 7, and 9) into which the ends of lever shaft 33 (Figures 9 and 11) are entered by movement thereof toward the front, when lever 32 is assembled to the casing part C. Posts 41 may be of metal, being riveted over or staked in suitable holes in the flange part 40$^a$ to secure them to part 40. Putting part 40 in place, therefore, locks the pivot shaft 33 in its bearing recesses and thus completes the assembly of hand lever 32 to the casing part C.

The dished part 40$^b$ of mounting plate 40 has a slot in it through which a link 108 extends, the outer end of which link is pivotally connected to the inside face of signal lever 32 by pin 115 carried in suitable ears or lugs 32$^e$ and 32$^c$ formed in the lever 32, and the inner end of link 108 is connected to a spring-retracted driver element of the gear train mechanism M so that lever 32 is normally held in its home position as shown in Figure 1 and as shown in broken lines at L in Figure 9; however, when the lever is pulled outwardly and downwardly beyond a minimum range of movement to store energy in the spring of the spring motor sufficient to drive the code wheel 78 one or more rounds or revolutions and then released, the lever returns to its home position and upon so doing the gear mechanism is released and the stored energy extended to drive the code wheel 78, all as described in the parent application. In Figures 27–32 the code wheel is diagrammatically shown associated with and to actuate the code signal switch SP to effect breaks and makes in the signalling circuit according to the coded teeth on the code wheel 78.

As described in the parent application, the code switch SP is attached to the frame of the gear train mechanism M of Figure 2 in appropriate coacting relation to the code wheel 78 and the unitary sub-assembly comprising this gear train mechanism, and the base plate 40 (Figure 9) is closed over by a box-like casing 180 (Figures 2, 3, 4, and 9) which is preferably made of any suitable transparent material, preferably a plastic so as not to be fragile. It is preferably cast or molded and cured in one piece and, as is better shown in Figures 12 and 13, it comprises a flat top wall 181 and four side walls 180$^a$, 180$^b$, 180$^c$, and 180$^d$, the latter dimensioned freely but snugly to encompass the unit mechanism M and at their ends to be received snugly about the upstanding rib 27 (Figures 9 and 5) in the upper ends of the walls of the well 26, being seated against the outer ledge 26$^g$ of the latter. The housing 180 is held in position against this ledge by screws 179 (Figure 2) passing through holes 181$^c$ and 181$^d$ (Figure 12) in the top wall 181 and threaded into the frame of the gear train mechanism M. As shown in Figure 13, the housing side wall 180$^d$ is slotted at its lower edge at 180$^f$ for the passage therethrough of insulated flexible conductors that lead from the switches associated with the mechanism M within the housing 180.

Depending upon the system requirements, the gear train mechanism M may have associated with it a non-interfering switch which is diagrammatically indicated at NI in Figures 27, 29, and 32 which is actuated by an arm 97, shown in those figures, by the gear train mechanism, but only for such period of time as coincides with the actual code-transmitting rotation of the code wheel 78, as described in the parent application; when so actuated, it is closed to shunt out other signalling stations in the illustrative type of signalling system shown in Figures 27, 29, and 32.

Again, depending upon the system requirements, it is sometimes necessary to provide a switch that is connected through suitable circuits to a municipal alarm box or station, or to a local station having visual or other source-identifying signal mechanism such as an annunciator to indicate the source of the alarm without having to wait out the transmission of the coded signal. Such a switch is also associated with the gear train mechanism M and in Figures 27–32 it is diagrammatically indicated by the reference character MA and is shown as provided with an actuator 170—171 which is associated with the mechanism M preferably, as described in the parent application, to be actuated in response to an initial minimum actuation of the alarm lever 32 sufficient, as above described, to initiate at least one round of signal-transmitting rotation of the code wheel 78. The conductors leading from switch MA are passed out of the housing 180 through slot 180$^f$, as is the case with the conductors leading from the non-interfering switch NI.

Certain test operations are frequently required; for one of these, once access to the interior of the signalling station has been gained as is later described, provision is made to set the mechanism M into action without having to pull the external alarm lever 32. Accordingly an aperture 180$^e$ is provided (Figure 13) in the side wall 180$^d$ of transparent housing 180, the aperture being juxtaposed to a winding slot in the hub of a spring-winding gear 158 (Figure 2) of the gear train so that a key may be inserted through the casing wall into the winding slot to wind the spring of the spring motor to actuate the mechanism for one or more signal rounds, as described in detail in the parent application. The operation of the mechanism M may thus be witnessed and inspected.

For selective coaction with the just described test-winding operation there is also associated with the gear train mechanism M a test switch TP shown diagrammatically in Figures 27–32 and provided with a manual operator 165 which is in the form of a small handle or knob that projects through an aperture 181$^a$ formed in a depressed portion 181$^b$ (Figures 12 and 13) in the top wall 181 of the transparent housing 180 so that the manual switch TP may be operated from the exterior of the housing 180. With the location of handle 165 closely adjacent one side edge of the top wall 181 (Figure 12), the remaining and large flat area of the top wall 181 is utilized to imprint, in any suitable manner, full instructions typified by those appearing illustratively in Figure 23. Those instructions, of course, will vary according to what switch devices and the like are assembled as part of the unit mechanism M within the housing 180 to meet particular requirements; the switch structure TP itself may embody various combinations of switch contacts, several of which combinations are illustrated in Figures 27–32 and, as there indicated, the number of conductors leading therefrom may vary. These conductors are insulated conductors and are led out of housing 180 by way of side slot 180$^f$ (Figure 13).

Aside from the simplest form of signal switch SP for the coded wheel 78, the sub-assembly M (Figures 2, 3, and 4) can thus comprise as many as desired or required of these coacting switch structures, at least some of which in turn may take various forms according to the type or types of alarm systems with which they are to be associated, and this composite sub-assembly M is assembled to the casing part C as earlier above described.

The plate-like lever 32 is flush with the front face of the casing part C and in home position closes over the well aperture 26 and partially closes the hand hole H. The wall 26$^a$ of the well 26 (Figures 5 and 9) has an inclined face 28$^c$ that forms one of the boundaries of the hand hole H, being the lower wall face when casing part C is in upright closing position as in Figure 1, and in that position foreign matter cannot accumulate in the hand hole.

Lever 32, plate-like in form (Figures 10 and 11), closes all but the upper portion of the hand hole as seen in Figure 1 so that the fingers of the hand can be easily inserted behind the lever to pull it out, and just above the front edge of the inclined wall face 28$^c$, lever 32 has a transverse rectangular aperture 32$^g$ along and from the bottom edge of which (as seen from the right in Figures 10 and 11) there is an inwardly extending wall 32$^h$ which is inclined and which when lever 32 is in closed or home position overlies the inclined wall face 28$^c$ of the hand hole H and forms a false bottom therefor so that any foreign matter maliciously or otherwise injected into the hand hole H simply falls out of the downwardly and outwardly inclined false bottom 32$^h$ and rolls or flows out through the transverse aperture 32$^g$. This action is aided by integrally-formed triangularly-shaped side walls 32$^i$ and 32$^j$ which extend inwardly from the upper sides of the plate-like lever 32 and in closed position of the latter may rest closely adjacent the plane side walls of the hand hole H; being integrally cast with the other parts, these side walls also materially strengthen and reinforce the lever structure. Moreover, there is thus formed a protective pocket at the internal upper end of the lever so that the fingers of the hand in pulling the lever are protected against scraping against the walls of the hand hole H.

For some installations it is desirable to provide deterrents against tampering and also a corresponding telltale signal, and in such case provision is made for easily modifying the outer casing sub-assembly C and also the sub-assembly L comprising the lever 32, as above described, and these provisions include the mounting of a member made up of an appropriately frangible material such as glass, for coaction with the lever and front casing part. This frangible member is preferably made up in the form of a round glass rod G, shown in Figure 1 as extending crosswise and in front of the lever 32; it is longer than the width of the lever 32 and its ends are supported at the front of the casing part C, preferably by two stirrup structures 183 and 184 (Figures 1, 7, and 9).

The left-hand stirrup 183 (Figures 1 and 7) is substantially U-shaped, with one end closing wall 183$^a$, and it has two cylindrical stud extensions 183$^b$ and 183$^c$ (Figure 9) which are received through holes drilled through an appropriate ledge formed in the side wall 26$^b$ of the well 26 (Figure 7); these extensions 183$^b$ and 183$^c$ are headed over at their inner free ends, as indicated, preferably with interposed washers (Figures 7, 9, and 5), thus securing the stirrup 183 to the casing part C, with its recess flush with the plane of the side edge of the well opening in the front wall of the casing part C.

The other stirrup 184 is also U-shaped, having an end closing wall 184$^a$ (Figure 7) and two cylindrical but longer extensions 184$^b$ and 184$^c$ (Figures 5 and 7), the latter having aligned notched passed through holes drilled in the ledge formed in the well side wall 26$^c$ (see Figure 7) to position stirrup 184 in alignment with stirrup 183 and with the open ends of their recesses facing toward each other (Figure 7).

The free ends of the extensions 184$^b$ and 184$^c$ are shouldered or stepped to receive washers, as shown in Figures 7 and 5, riveted in place. With the extensions of stirrup 184 of substantial length as shown, stirrup 184 may be moved outwardly (downwardly in Figure 7) to move the stirrup 184 away from the front face of casing part C until the washers abut against the ledge; this range of movement is large enough (see Figure 7) to permit one end of the glass rod G to be slid in under the stirrup 184 and between the projecting portions of the legs or extensions 184$^b$ and 184$^c$, whereupon the other end of the glass rod is entered into the pocket or recess of the fixed stirrup 183 and up against the closing wall 183$^a$, whence movable stirrup 184 is pushed inwardly so that it takes over that end of the glass rod, with closing wall 184$^a$ barring movement of the rod to the right.

When stirrup 184 is so restored to its normal position, the notches or slots of legs 184$^b$ and 184$^c$ are just above the face of the wall ledge (see Figure 7), whereupon an L-shaped locking piece 185, carried by a long pin 186 that extends slidably through a hole in the well wall 26$^c$, is actuated to enter these aligned slots and thus hold the stirrup 184 against movement.

The long pin 186 is preferably spring-held in the above-mentioned locking position, preferably by a coil spring 187 that surrounds the free end of the pin 186, and abuts at one end against the wall 26$^c$ and at the other against a knob 188. Knob 188 is exposed interiorly of the front casing part C and hence access to it can be gained only from the inside of the casing.

Accordingly the glass rod is easily and quickly mounted in position across the front face of the hand lever 32, the latter being held in closed or home position as above described. To the observer it appears as a physical barrier against manual movement of the lever 32 and the understanding that breakage results if the lever is pulled acts as a deterrent to tampering. Preferably the glass bar or rod G is held sufficiently snug against the front of the lever 32 to take up any material play in the lever mountings even though the lever is strongly held in closed position by the spring-bias imposed on it by the gear-train driver mechanism as above described, and for this purpose the lever 32 is preferably provided with a lug 32$^k$ (Figures 10, 11, and 1) projecting from its front face and substantially at the mid-point of its width and it is the lug 32$^k$ which engages the glass rod G substantially at its mid-point, and when the lever is to be pulled to send in an alarm the lug 32$^k$ can thus exert a bending and breaking stress upon the glass bar at the most efficient point in the latter relative to the spaced supports which the stirrups 183 and 184 provide. Lug 32$^k$ is preferably shaped (see Figure 10) to provide an inclined edge for contact with the glass bar and its angle of inclination, in coaction with the circular cross-section of the glass bar, gives this edge a force-multiplying action, somewhat on the principle of the wedge or inclined plane, and in effect to strain or wedge the mid-point of the glass bar downwardly as seen in Figure 1, as well as outwardly away from the face of the front casing part C. Fracture of the rod G is thus facilitated and undue resistance to pulling the lever avoided. These actions are further aided by the force-multiplying action of the lever 32 itself, since it is preferred that the lug 32$^k$ be positioned materially nearer the axis 33 of the lever 32 than is the finger-grip portion thereof at the opposite end.

The downward wedging action of the lug 32$^k$ coupled with the downward swing of the plate-like lever 32 coact to direct any pieces of the fractured rod G downwardly and hence away from the person operating the alarm, the broad expanse of the lever 32 and its downward swing acting somewhat like a baffle or shield. Replacement of the broken glass rod G is easily and quickly accomplished once the front casing part C is swung into the horizontal position shown in Figures 2, 3, and 4 and set; the knob 188 (Figure 7) is simply pushed to the left, disengaging the part 185 from the slots and thus releasing the stirrup 184 for manipulation above described to put in a new glass rod. Restoration of stirrup 184 to its inward position automatically enters the locked part 185 into the slots, under the action of spring 187.

Just below (to the right in Figures 10 and 11) the glass-breaking lug 32$^k$ the plate-like lever 32 has a hole through which projects a pin 190 that is mounted for movement toward or away from the glass rod G which the front face of pin 190 normally engages tangentially; such a mounting may comprise a flat spring 191 (Figures 10 and 11) in a suitable hole in which one end of pin 190 is secured, as by heading it over. Flat spring 191 is secured flatwise against the inner face of lever 32 by a rivet 192 at one end of the spring and hence spring 191 is biased to hold pin 190 projected beyond the front face of the lever 32, as shown in Figure 10. This bias of spring 191 is overcome, and the pin 190 is pushed and held inwardly, by the glass rod G that extends across the front of the lever 32 (Figure 1) and thus the free end of flat spring 191 is held spaced away from the inside face of lever 32 as long as the glass rod G remains in the stirrup mounting above described. In that position flat spring 191, adjacent its free end, engages the actuator 193 of a suitable switch mechanism 194, which may be a precision snap-action switch, that is suitably secured and mounted in the space between the mechanism mounting plate 40 and the plate lever 32 (in closed position), preferably by securing it, as by screws, to the well wall 26ª (Figures 9 and 5).

Accordingly, with all the parts in normal or home position, glass rod G holds the flat spring 191 pressed inwardly, and thus switch actuator 193 is held in one of its two positions; the switch 194 is connected by appropriate circuits to any remotely positioned electro-responsive signalling device, such as an annunciator, located, for example, in a principal's or superintendent's office of a school or office building where a number of alarm stations are distributed throughout the building. Such a remote signal is immediately actuated upon the breakage of the glass rod G, whether or not the lever 32 is pulled. If the breakage results from tampering, the remote annuniciator is at once actuated, identifying the location of the signal station. Should the lever be pulled an amount insufficient to transmit even a single round, the glass is broken and the switch 194 is actuated by the physical movement of the lever 32 and flat spring 191 outwardly and away from the actuator 193, and immediate remote identification of location results. In either of these cases the remote signal dictates immediate investigation. If the lever is pulled sufficiently to transmit a coded alarm signal, the breakage of the glass and the actuation of the remote signal through the switch 194 also result and though a coded signal is transmitted, the annunciator identifies the station without having to await completion of the coded signal. In any case the remote telltale signal remains actuated until the broken glass rod is restored.

Figures 27 and 31 illustrate diagrammatically signal stations embodying such a telltale signal switch 194—193, adding one or more conductors to be connected up.

In some installations it is required to provide a key-operated switch which when actuated by someone in authority controls the actuation of a remote relay, usually to cause the sounding of additional or other alarm signals, such as other audible signals distributed throughout the building. In such case a switch generally indicated in Figure 5 at 195 is provided; it is carried by or secured to the inner end of an externally-threaded lock casing 196ª that extends through a hole 23ᶠ provided in the wall 21 (Figures 3 and 5) of casing part C, being locked thereto by nut 196ᵇ. Externally of wall 23 there projects or is exposed the barrel 196 of the key-tumbler controlled part of the switch 195, the barrel 196 having an appropriate key slot 197 to receive the key. Desirably this switch, while within the casing structure, is thus made operable from the exterior of the alarm station for usually it is desired to operate it quickly as soon as the person in authority arrives at the scene and decides that additional alarms should be actuated.

In Figures 27, 30, and 35 are diagrammatically shown signal stations utilizing such a switch 195, requiring an additional one or two conductors for wiring up the station.

The front casing part, with mechanisms and devices such as those described above assembled to it, is now assembled as such a sub-assembly to a wiring panel and supporting frame generally indicated by the reference character F (Figures 2, 3, 4, and 5), which preferably is an open frame, conveniently in the form of heavy sheet-metal stamping of generally rectangular shape and peripherally flanged as at 201. As is better shown in Figures 3, 4, and 16, the vertical side flanges are extended downwardly to form apertured ears 201ª (Figure 5) and 201ᵇ (Figures 3 and 4) which just fit inbetween the side walls 20 and 21 of the casing part C (Figure 5) closely adjacent the rear wall 22 which has integrally formed therewith, and spaced from the joining side walls 20 and 21 thereof, lugs 202 and 203 (Figures 5, 7, 8, and 9), the latter being apertured, as are also the side walls 20 and 21, to take the pivot pins that pass through the holes in the frame lugs 201ª and 201ᵇ. Thus the frame F and sub-assembly or casing part C are hingedly connected together about a horizontal axis and frame F becomes peripherally encompassed by the four side walls 20, 22, 21, and 23 of the casing part C into which the frame F just fits when the two parts are swung together. Frame F, when in the form of a stamping, is economically made in that in forming the four flanges that make up the peripheral flange 201, as is better shown in Figure 16, the ear-like extensions 201ª and 201ᵇ of the parallel vertical flanges are so much of the corners of the flat sheet stock as would otherwise be cut out in the stamping operation to bend and form the four flanges rearwardly; in the upper two corners, as seen in Figure 16, that material is actually cut-away while in the lower two corners that material is utilized to form the pivoting ears 201ª and 201ᵇ.

Frame F, as is later described, is secured in upright or vertical position, with the axis of pivotal connection at its lower end and horizontal, and means are provided to limit the extent of swing of the casing part C downwardly and away from the vertically-supported frame F. Such means preferably comprises a pair of pivotally connected links 205 (Figures 2, 3, 4, and 5), one of which is pivotally connected to a lug 201ᶜ that is struck up out of the frame F and the other of which is pivotally connected by a pin 206 mounted in aligned holes in a boss 21ª formed in the casing side wall 21 and a lug 24ª formed integrally with and on the inside face of the front casing wall 24 (Figures 5, 7, and 8); these links permit downward and outward swing of the casing part C with the elements asembled to it, through an angle of just about 90° (see Figures 3 and 4). The upper link preferably has a slot 205ª through which passes the headed pin 207 secured to frame lug 201ᶜ and it also has an extension 205ᵇ (Figures 3 and 4) shaped about as indicated and adapted to contact and ride along the front face of the frame just above the hole out of which the lug 201ᶜ is pressed (see Figure 27). When casing part C (Figures 3 and 4) is pushed upwardly, upper link 205 rides along pin 207 via the slot 205ª; its end edge engages the frame F and cams or levers the links in counter-clockwise direction and insures that the two links 205 fold inwardly, not outwardly.

With frame F thus assembled to the above-described sub-assembly, the appropriate electrical parts of the latter are wired by suitable insulated conductors to a terminal block carried by the frame F so that in effecting ultimate installation, circuit connections to the signalling system may be readily made. The number of signalling circuit conductors to which connection has to be made at the signalling station depends upon various factors, such as the type of system or circuit and the particular requirement as to what circuit controlling devices, in addition to the code-wheel-actuated signal switch SP, have to be incorporated into the sub-assembly C. The minimum number of circuit conductors for connection into the system is two and, illustratively, the maximum number may be as high as eight, and the latter number is here adopted, for convenience in description, to illustrate such a maximum number.

Referring to Figures 14 and 15, there is made out of suitable insulating material, and preferably by molding out of Bakelite, a long bar 210 generally rectangular in cross-section excepting that at regular intervals it has upstanding from one face thereof transverse ribs 211 of substantial height and which ultimately serve as barriers, and they will be so referred to. Between successive barriers holes are molded in the bar stock 210, one hole for each interval between successive barriers 211 and between the endmost barriers and the respective end faces of the bar stock itself; these holes are staggered, as shown in Figure 14, so that they form upper and lower straight-line series of holes. The holes of the upper series are indicated at 212 and those of the lower series at 213. All the holes are the same. As is well indicated in Figures 14 and 15, the upper half of each hole is hexagonal in cross-section and the lower half is circular in cross-section. From such non-conductive molded bar stock terminal connecting blocks are made up according to the needs of the particular installation, and the frame F is constructed to coact with whatever length of terminal block is thus made up.

As is better shown in Figures 16 and 17, the frame F is cut or stamped to provide two arms or brackets 214 and 215 that extend toward each other and are bent at their fixed ends so that they lie in a plane forwardly of the front face of the frame F and (Figure 17) forwardly of the plane of the rear edge of the peripheral flange 201. The left bracket 214 is provided with a series of holes 216 and the like bracket 215 has a series of holes 217; the holes 216 and 217 are displaced vertically by the same amount that the holes 213 and 212 of the insulating bar stock of Figure 14 are displaced, and the spacing of the holes 216 and 217 horizontally, in Figure 16, is the same as the horizontal spacing between the holes 213—212, 213—212, etc., of Figure 14. The gap between the adjacent free ends of the brackets 214 and 215 is equal to the length of so much of the bar 210 of Figure 14 as includes three barrier ribs 211.

On the back face of the brackets 214, 215 (Figure 16) the brackets are scored transversely of their length and midway between successive holes 216 in bracket 214 and holes 217 in bracket 215, as indicated by the scoring 218 for bracket 214 and the scoring 219 for bracket 215.

If the installation requires only two terminal connectors the bar 210 of Figures 14 and 15 is sawed off along the line C—C and the cut is made thick enough to remove the barrier rib on the line C—C, thus providing a block 210ª that has four holes and three barrier ribs, as shown in Figures 18 and 19.

If the installation requires eight terminal connectors the insulating bar 210 of Figures 14 and 15 is cut off to include ten holes and nine barrier ribs, and if it has already been cut off along the line C—C the next cut is along the line F—F, thus providing a length of block 210ᵇ as shown in Figures 20 and 21.

In all of the holes of blocks 210ª and 210ᵇ there is now inserted an internally threaded bushing 220 (Figure 22) having an upper hexagonal part 220ª to fit the hexagonal portions of the holes 212 and 213 and having a sleeve part 220ᵇ that fits the cylindrical portion of these holes and projects beyond the face of the block. At the end holes in the blocks 210ª and 210ᵇ the sleeve ends 220ᵇ of the inserted bushings are spun over as indicated at 220ᶜ. At the intermediate holes there is slid onto the protruding sleeve ends 220ᵇ a terminal conductor 221 and then the protruding sleeve end is spun over as indicated at 220ᶠ. Into the bushings 220 that intervene the barriers 211 there are now threaded connector screws 222 so that the conductors may be secured on the front face and between successive barriers 211. In like manner terminal or connector blocks of different lengths, and hence with different numbers of connecting devices, may be prepared.

The 2-connector block 210ª is now assembled to the brackets 214, 215 by bridging it across the free ends of the brackets, with the end area thereof resting against the rear faces of the brackets, as shown in Figures 23 and 24, the connecting screws 222, vertically displaced, being exposed forwardly of the frame F and with the three barriers 211 projecting forwardly beyond the plane of the brackets 214 and 215; it is secured in place by screws 225 that are passed through the endmost holes 216 and 217 in the brackets and threaded into the bushings at the respective ends of the block 210ª, these bushings being devoid of connector tabs (see Figure 19). The gap between the free ends of brackets 214 and 215 is just sufficient to accommodate the block with three ribs and two intervening connectors.

Where the required number of connectors is greater than two, illustratively the eight connectors of the terminal block 210ª of Figures 20 and 21, the gap between the free ends of the brackets 214 and 215 is widened by breaking off appropriate portions at the scoring 217 and 218 (Figure 17), and in Figures 25 and 26 bracket arms 214 and 215 are shown broken off or shortened to accommodate therebetween the nine spaced ribs with the intervening eight connectors; in that case one hole 216 in bracket 214 and one hole 217 in bracket 215 remain to overlie the ribless end portions of the block 210ᵇ (Figures 25 and 26) and they become aligned with the correspondingly staggered connector-less bushings in the end portions of the block 210ᵇ so that the latter can be secured by screws threaded into these end bushings. Were the connector block to have six terminal connectors, two scored sections of each of the brackets 214, 215 of Figure 16 would be broken off and in like manner the bracket lengths are thus determined for whatever the terminal connector requirement may be.

In each case, as illustratively shown in Figures 24 and 26, the plane of the rear face of the ribbed terminal block falls coincident with or forwardly of the plane of the rearmost edge of flange 201.

The various connectors that are connected to the switch mechanisms assembled to the hinged or movable casing part C, as above described, are bunched together and may be taped or held together by an appropriate length of flexible sleeving of insulating material so as to form, in effect, a cable. Such bunched conductors emerge from the mechanism inside of the transparent cover 180 by way of a slot 180ᶠ (Figure 13) in the side wall 180ᵈ of the casing 180, the slot matching the curved cutaway portion 27ª (Figures 9 and 5) in the upstanding rib 27 about which the casing walls seat. From that point on the bunched conductors, with any such others as may otherwise be needed, are simply run rearwardly, as viewed in Figure 5, toward the hinged connection of the casing part C with the frame F, whence they are passed through a hole 226 (Figures 2 and 16) provided in the wide left-hand portion of the frame F so that they can run upwardly on the rear face of that part of the frame, being somewhat pocketed between the side flange of the casing and a rearwardly-bent flange part 227 of the frame. The conductors are thus led to one end of the rear face of the connector block that extends crosswise of the open frame F, as above described, whence the conductors are fanned out to either side on a line that runs midway of the staggered connector tabs 221 (see Figures 19 and 21) to which they are respectively connected by bending and soldering. Thus the cable or bunched conductors are neatly compacted and concealed behind the frame F, leaving only the connecting screws 222 (Figures 23 and 26), with their intervening ribs or barriers 211 forwardly exposed and accessible for connection to the circuit conductors, and with color or number identification of the binding screws 222 with the bunched conductors the connections are easily made.

As above noted, frame F is cut out or open at its major central portions: this area is substantial, so that when the frame F and the casing C are swung together about the horizontal axis of pivoting, the mechanism M carried by the casing part C and covered over by the transparent cover box 180 freely passes into the opening in the frame F and a substantial part of it stands projected to the rear of the frame F. Though the terminal connector block extends crosswise of the frame F and of the opening therein, it is positioned adjacent the upper part of the frame so as not to interfere with the free movement of the covered mechanism M into or out of the frame opening and also to coact with other features later described.

As is better shown in Figure 16, frame F is provided with four corner holes 230 and with four inclined corner slots 231 for selectively assembling the sub-assembly comprising the frame F and the horizontally-hinged casing part C and the mechanism carried by it, all wired and connected up to the terminal block in the frame F, to the companion casing part B of Figure 3 or the companion casing part BB of Figure 4 and thus also to accommodate and close over the parts of the mechanism that project rearwardly through the frame F. These companion casing parts B and BB are also constructed to meet the standards or requirements for safe wiring installations, as by the use of conductor-carrying conduit, etc. Where the wiring is concealed or in the walls, the casing counterpart B of Figures 3 and 3ª is employed for it is constructed to be set into a suitable recess in such a wall; and where the wiring is surface wiring, or where the signal station has to be mounted on a wall or other surface, the casing counterpart BB of Figures 4 and 4ª is employed.

The casing part B, for a recessed installation, is preferably made of heavy sheet metal and can be formed out of a sheet-metal stamping to provide a back wall 233 (Figures 3 and 3ª), opposed side walls 234 and 235, and top and bottom walls 236 and 237 which can be flanged at their ends, as indicated at 238, to provide the regions overlapping with the side walls 234 and 235 for spot welding. In length and breadth the casing part B is materially smaller than the length and breadth of the frame F (Figure 16) so that the four-part peripheral flange 201 of the frame F can encompass the open end of the casing part B with considerable looseness. The five faces of the casing part B may also be provided with suitably located knock-outs, one of which is indicated at 240, to facilitate mechanical connection thereto of conductor-carrying conduit, etc., and also with suitable holes 239 to fasten the casing B, as by screws or nails, in the recess formed in a wall indicated at W in Figure 3.

There are provided inwardly-directed ears or lugs adjacent the open end of the casing part B, as indicated at 241, illustratively four in number, and conveniently comprising cut and bent portions of the sheet metal of the side walls 234 and 235 and the top wall 236; they are provided with threaded holes, as shown in Figure 3ª. These threaded holes receive fastening screws 242 (Figure 3) that pass through the inclined slots 231 in the frame F (see Figure 16) to fasten the sub-assembly F—M—C securely to the casing counterpart B, in the relationship shown in Figure 3, in which the peripheral frame flange 201 takes over the smaller open end of the box casing B and is spaced from the walls of the latter sufficiently to abut edgewise against the finished wall surface, such as plaster or the like. The inclination of the walls 231 in the frame F permits tilting adjustment in securing the frame F in place so that the latter stands plumb even though the inset casing part B is out of plumb. Moreover, the lugs or ears 241 (Figure 3) extend inwardly from the front edge of the casing part B, and the frame flange 201 is of sufficient length to insure that the frame F rests flatwise against the surface of the wall W even though the box casing B projects more or less or not at all from the wall and even though its front edge is not parallel to the wall surface.

A building may thus be wired up and provided with recessed casing parts B in course of its construction and upon completion of plastering or wall finishing, the folded-together assemblage F—M—C delivered and assembled to be installed in the box casing B, as above described, whereupon the conductors that are brought into the recessed casing B are connected to the binding screws 222 of the terminal block carried by the frame F. Each conductor is brought to its binding screw 222 between two spaced barriers 211 and, if desired, and with the staggered relation of the binding screws 222, some of the conductors can be brought over the top edge of the terminal block and the others around the bottom edge, it being noted that all these connections are made with facility on the front face of the terminal block and, hence, facing the workmen.

With the circuit conductors connected to the binding post 222 the terminal block and its connections are now closed over and protected by a heavy plate-like shield 250 made of an insulating material, preferably one that is not brittle, such as heavy sheet cellulose acetate; in Figures 23 to 26 the shield 250 is shown in open position and in Figure 2 it is shown in shielding position. In length and breadth it is dimensioned to cover over the terminal block regardless of the selected length that the latter has, as above described.

Where the terminal block is less than the full or maximum length, as is illustrated in Figures 23 and 24 with respect to the terminal block 210ª, the shield 250 is pivotally mounted, as by a bolt 251 that passes through the outermost hole 217 in the extension 215 (see also Figure 16), and the hole in the shield 250 for the bolt 251 is in the upper right-hand corner; so that the shield 250 clears the barriers 211, the bolt has a collar 252, and under the head of the bolt is a spring washer 253 which is tensioned by the nut 254 to frictionally hold the shield 250 in whatever position it is swung about the bolt as an axis.

At its left-hand end the shield 250 has a slot 250ª to ride over the neck 255ª of a headed and shouldered bolt 255 that passes through the endmost hole 216 in the bracket 214, where it is held by a nut 256. In closed position the shield 250 is thus dependably held against being forced out of its own plane and is thus maintained in position to cover over the binding screws 222 and the conductors leading to them.

Where the terminal block is of maximum or full length, as is illustrated in Figures 25 and 26 with respect to the terminal block 210ᵇ, the shield 250 is again mounted, as above described, by means of the bolts 251 and 255 that pass, respectively, through the outermost holes 217 and 216 in the frame brackets; underlying these holes, as is better shown in Figure 26, are the endmost ribless portions of the connector block 210ᵇ and also the threaded bushings in these end portions, and accordingly these bushings provide the nuts for the bolts 251 and 255 which are threaded into them so that the bolts or screws not only secure the terminal block in place but also mount the shield for action and manipulation as above described.

Moreover, and in either case, the shield 250, because of the stop action of the neck 255ª of the bolt 255, can be swung into open position only by movement of its left-hand end upwardly, as indicated in Figures 23 and 24, and in such position a substantial portion of the shield 250 projects beyond the upper edge of the frame F and also overlies and blocks off a horizontal slot 257 near the lower edge of the upper cross-part of the frame F (Figures 16, 23, and 25). As is later described, slot 257 receives a latch 260 carried by the front wall 23 of the casing part C to hold the latter in closed position, as shown in Figure 1. Accordingly, casing part C and the mechanism carried thereby cannot be swung into closed position unless and until the shield plate 250 is swung downwardly, in Figures 23 and 25, to close over the connecting terminal block, for portions of the shield 250 that project beyond the upper edge of the frame F block the movement of the wall 23 of casing part C which has to ride over that edge, and even if shield 250 clears the upper edge of frame F, it still remains in position to block off the slot 257 and thus prevent the latch 260 from entering it.

As above noted, frame F (Figure 16) has four corner holes 230 to facilitate assemblage of the sub-assembly C—M—F to the casing counterpart BB of Figures 4 and 4ª. Casing part BB for surface mounting, illustratively in the form of a casting, has a back wall 270 and integrally formed opposed side walls 271 and 272 and top and bottom walls 273 and 274. Back wall 270 has suitable holes 270ª to secure it, as by screws, to the face of a wall or support indicated at WS and preferably holes 270ª are so distributed that they will overlie the holes 241 of a wall-recessed connector box (like that of Figure 3ª), in which case such a box serves as the support for part BB, by screws threaded into holes 241; in the latter case wall 270 has a break-out or thin web 270ᵇ which is broken out for passage of conductors into casing part BB. The walls, such as top and bottom walls 273 and 274, can have reinforced threaded holes 273ª and 274ª for connection thereto of tubular conduit to bring the circuit conductors into and out of the casing counterpart BB.

As seen in Figure 4ª, the side, top, and bottom walls of the part BB have broad faced-off and continuous edge faces, and the top and side parts of the continuous rearwardly extending flange 201 of the frame F rest edgewise against the broad edge face of the top and side walls of the part BB. The rear wall 22 of casing part C, when closed, rests flush against the broad edge face of the bottom wall 274. The four corner holes 230 in frame F overlie the threaded holes 275 in the ears or posts 276 formed integrally with the side walls of casing part BB. Screws 277 (Figure 4) pass through the holes 230 and are threaded into the lug holes 275, thus securing the frame F with the casing part C and mechanism M to the surface-mounted casing part BB; with the latter initially plumb, the just-described assemblage by the screws 277 insures that the casing part C is likewise plumb and also has its side walls parallel to the side walls of the surface-mounted part BB.

A building or the like may be wired up with tubular conduit-carrying conductors and with as many casing counterparts BB wall-mounted and pipe-connected, and upon completion of such work the folded-together assemblages F, M, C delivered and assembled, in the manner just described, each to its own box casing BB; the conductors that are brought into the casing part BB are then connected to the binding screws 222 of the terminal block carried by the frame F and the shield 250 is placed in closing position, whereupon the casing part C with the mechanism M can be swung upwardly and into the closing position shown in Figure 1 and thus, as in the case of the wall-recessed installation of Figures 3 and 3ª, a substantial portion of the mechanism M is carried upwardly and into the interior of the casing part BB.

Particularly where the installation has many conductors, some of which pass through the conduit casing part B (in Figure 3) or BB (in Figure 4) because they are special conductors related to other local stations than the one housed in the particular connector box part, it is desirable to preclude such conductors, or the sometimes cumbersome insulated connectors where connections are made, from mechanically interfering with the accommodation of the mechanism M in the box part B or BB, and in such case the back wall of the wall-supported casing part is provided with an auxiliary housing-like part into which the mechanism M swings and substantially telescopes and out of which it is easy to keep the undesired conductors such as those above mentioned. Such a housing-like part is illustrated in Figures 4 and 4ª and is designated generally by the reference character 280, and where the casing counterpart is cast, the part 280 can be conveniently cast integrally therewith, particularly integral with the back wall 270, which thus forms the back wall of the housing part 280. Projecting forwardly in Figure 4ª and to the left in Figure 4, and of substantial length in those directions, are the opposed side walls 280ª and 280ᵇ and top and bottom walls 280ᶜ and 280ᶠ formed integrally with the back wall 270 and spaced apart from each other at distances materially greater than the length and width of the mechanism M, as viewed from above in Figure 3 or Figure 4. There is thus provided substantial clearance for the easy and free entry of the encased mechanism M into the front open end of the housing part 280 as the casing part C is swung to closing position to carry the mechanism upwardly and inwardly into the casing counterpart. Also, a substantial portion of the encased mechanism M enters the auxiliary housing part 280 and gives added protection thereto.

Preferably the walls of the housing part 280 are rounded off at their corners (see Figure 4ª) to avoid sharp edges and to provide funnel-like entry and exit ends for the relatively deep and wide channels that are formed between the walls of the casing part BB and the walls of the housing part 280, for the above-mentioned conductors are led in these channels as they pass from one conduit connection 273ª to the other 274ª, or vice versa, the walls of housing 280 preventing such conductors from coming into engagement with the mechanism M even if these conductors are pulled via one of the conduits.

To facilitate conductor pulling during wiring up of the system, the top and bottom walls 280ᶜ and 280ᶠ (Figures 4 and 4ª) are cut out, as at 281 and 282, in line with the common vertical axis of the conduit connections 273ª and 274ª and throughout areas materially greater than the area of the conduit connector openings themselves, the cutouts being rounded over at their edges (Figure 4) and also rounded in contour or shape throughout a radius materially greater than the radius of the holes 273ª and 274ª. Accordingly conductors can be pulled, during wiring installation, right through the connector wall casing part without being obstructed by the auxiliary housing part 280 for the straight line of pull from one conduit connection through the other tensions the pulled conductor right through the rounded and large cutouts 281, 282 without risk of the conductor or its insulation abrading thereagainst. Moreover, in that manner conductors may be pulled even through a completed alarm signal installation for, to gain access to the particular wall connector casing part, the front casing part C has to be swung into open position as in Figure 4 and that movement moves the mechanism M out of the interior housing part 280 and clears the latter for pulling of conductors as above described. Conductors so pulled, if not to be connected to the particular local mechanism, are then pulled at the local installation sufficiently to gain enough slack to lift them out of the cutouts 281, 282 and move them over the walls of the housing part 280 and into the above-mentioned channels to either side of the latter. The back wall of the housing part 280 can bear a legend of instruction, as in Figure 4ª, such as "Keep Wires Out".

The latch 260 can take any convenient form; preferably it is a spring latch so that it automatically latches and locks the parts C and F together, and it also has suitable provision for operating it by a key or like device on the exterior of the closed enclosure C—B. Illustratively and referring to Figure 6, the latch 260 may be shaped to cam its way past one of the narrow end edges of the slot 257 and to have a slot 260ᵇ therein so that it can take in back of the metal of the frame F. Latch 260 is secured to a stud shaft 261 (see also Figures 5 and 9) that is rotatively mounted in a boss 23ᵇ formed on the inside of the wall 23 and provided with a stepped hole in which the pin or shaft 261 is rotatively mounted, with the slotted head 262 of the shaft 261 seated deep in the outer and large end of the hole. The slotted head 262 is thus hidden and in Figure 1 is in an inconspicuous location; with a flat key or a screwdriver inserted into the hole and into the slot of the head 262, the latch 260 may be manually controlled.

The latch is spring-biased in locking or closing direction by a coil spring 263 (Figure 6) set into a hole in a stepped part of the boss 23ᵇ, with its outer or free end taking over the shank of a headed stud 264, the head of which provides a large bearing contact with a shoulder formed on the latch 260, whereby the spring biases the latch 260 in counter-clockwise direction in Figure 6 to an extent permitted by the engagement of a shoulder-like extension 260ᶜ, on the other side of the pivot pin 261 from the spring 263, with a stepped portion of the boss 23ᵇ.

The spring 263 thus holds the latch 260 in hooked engagement, through the slot 257, with the heavy sheet-metal of the frame F; the slotted or hooked part 260ᵇ (Figure 6) is located so that in locked position the line of pull or force tending to swing open the horizontally pivoted sub-assembly C—L—M is substantially through the axis of the latch pivoting stud 261 and hence no material moment of force can in that way be exerted tending to swing the latch 260 in unhooking direction. Moreover, with the parts in closed position as in Figure 1, a substantial portion of the mechanism M and other parts carried by the casing part C falls to the rear of the horizontal pivoting axis of the casing part B or BB, and thus the weight of such portion acts in a direction to tend to hold the sub-assembly C—M against swinging movement and thus aids the latch in holding the parts in mechanism-enclosing position.

To take up possible play in the parts when in locked and enclosing relation, it is preferred to interpose a spring between the casing part C and the frame F to coact, by its reaction, in maintaining the hooked part 260ᵇ of the latch 260 in snug engagement behind slotted part of the frame F; illustratively a flat bowed spring 265 (Figures 5, 6, and 9) may be employed for this purpose and it is riveted or staked, as at 266, to a flat face of the boss 23ᵇ formed on the inside of the wall 23 of casing part C. As better appears in Figures 6 and 9, the two arms of bowed spring 265 normally project beyond the plane of the edges of the walls of casing part C, and when the latter is in closed position the arms engage the top cross-part of the frame F and yield as the latch 260 is cammed through the slot 257 and thereafter the two spring arms remain under strain and take up any possible play between the parts. When the latch is released by the key the spring 265 tends to start the swinging movement of casing part C in opening direction, causing a desirable quick response to the operation of the key, whence the casing part can be guided by hand in its downward swing to the horizontal position shown in Figures 2, 3, and 4. Links 285 unfold and stop the downward and outward swing to halt the casing part C in its horizontal position, making the mechanism readily accessible and presenting and holding it in a completely convenient position, in fact, just as though the mechanism were laid out on a work table. For example, if the installation is unfolded as above described, for the purpose of restoring a glass rod, all that need be done is to place the finger of one hand on the button or knob 188 (Figures 5 and 7), which is preferably painted a bright color like yellow, push it inwardly to disengage the latch from the legs of the stirrup 184 which either drops downwardly as seen in Figure 7 or is easily pulled downwardly with the other hand, whereupon insertion of a new glass rod in the stirrups 183 and 184 is easily accomplished in the manner earlier above described, being further facilitated by the clearances provided by the slanting faces 183ʲ and 184ʲ of the stirrups.

If the apparatus is so unfolded for test or local drill purpose, full instructions appear on the top wall of the transparent housing 180 (see Figures 12 and 13) in a position easily and conveniently read and the parts to be manually manipulated or actuated being also compactly and readily accessible. These operations, according to the instructions, do not require technical knowledge of the switching arrangements or mechanical features of the construction and this advantage will be better understood after brief description of several typical installations and circuit arrangements, of the many that are possible, to meet correspondingly broad ranges of specified requirements. Such consideration will also aid in better understanding the above described flexibility of the terminal or connector block assembly.

In Figure 27 is shown a simplified and diagrammatic circuit arrangement illustrative of a goodly number of requirements to be met in a single installation and diagrammatically showing how a folded-up sub-assembly F—C—M may be completed and wired up and then shipped to the job for assembly to the wall casing counterpart B or BB, leaving only the conductors in the latter to be connected to the binding screws 222 of the terminal block at the top of the frame F. In Figure 27 is indicated the terminal block 210ᵇ of Figures 25 and 26, provided with eight binding screws 222.

Code signal switch SP, actuated by code wheel 78 (Figure 2), and the shunt non-interfering switch NI, and the test switch TP have their spring contact blades electrically interconnected as shown in Figure 27 and, as so interconnected, are provided with three conductors that run to three of the connectors 221 on the back of the terminal block 210ᵇ. Switch MA has its two contacts connected to two other tabs on the back of the terminal block 210ᵇ, and the break-glass switch 194 and the key-operated switch 195 can have one conductor in common and hence require only three conductors to lead them to three other connecting tabs 221 on the back of the terminal block 210ᵇ. There are thus eight circuit connections to be made to the eight binding screws 222, with the conductors that are brought into the wall casing part B or BB.

Breaking the glass rod G causes the switch 194 (see also Figure 9) to open and it remains open until the glass rod is replaced and the switch actuator 193 thereby restored to circuit-closing position. Whatever signal is actuated by switch 195 remains actuated until the glass rod is replaced.

Switch MA is frequently connected into a circuit that leads to a municipal or city fire alarm box which otherwise is not connected to the local building fire alarm system or, as above noted, it may lead to a local building panel, ofttimes in the building superintendent's office, where it actuates an annunicator or other appropriate signalling device, including an audible signal.

Typical normal switch contact relationships are as shown in Figure 27. A typical installation appears as seen in Figure 1, folded together and closed. Pulling the lever breaks the glass, with results upon the break-glass switch 194 as just described. Switch MA is actuated, that is, opened on a closed circuit, the instant that the lever 32 is pulled far enough to effect the ultimate transmission of one round; it can thus actuate a local annunciator or audible signal or, in known manner, electromagnetically trip the municipal or city fire alarm box, thus sounding the alarm at the municipal fire station. As soon as the lever 32 is released and is returned home as above described, the gear train is set into motion and starts the code wheel 78 rotating and the moment that the gear train starts, the switch NI is actuated to close it and hold it closed, thus shunting out other local signalling stations and preventing them from interfering, and switch NI continues to be held closed until the moment when the gear train and code wheel 78 stop. Assuming that the switch SP has transmitted a coded signal to the building office and also sounded a local audible signal, for example, on the building floor where the particular station is located, someone in authority arriving at the signal station might then have to decide that a general building alarm should be sounded, that is, audible signals, for example, on all floors of the building, and in that case he uses a key to actuate the switch 195 through the externally accessible keyhole 197 (see Figures 3, 4, and 5) and to do this he need not even take the time to open or unfold the local signal station.

If the local station is to be actuated for fire drill it is simply unfolded, using a simple form of flat key to actuate the latch by way of the slotted stud 262 accessible at the top of the casing part C (Figure 1), and the casing part C is let down into its horizontal position as shown in Figures 2, 3, and 4. A flat key is then inserted through the left-hand wall of the transparent housing 180, as seen in Figures 2 and 12, through the hole 180ᵉ in Figure 13, so that it enters a slot in the hub 158 of a gear of the gear train, and the key is simply turned to wind up the spring of the gear train; as described in detail in the parent application, the key can be turned only in one direction, to turn the spring-winding shaft of the gear train M to set the latter in motion.

The main spring cannot be overwound and the maximum range throughout which the mechanism can be actuated by the winding key is positively limited, as described in the parent application, to a winding operation which is equivalent to four rounds, just the same as a single complete pull of the lever 32 effects a winding operation that results in a maximum of four rounds of signal; it is possible, of course, with the winding key, to turn the spring-winding shaft throughout a range equal to one round, two rounds, or three rounds.

In that manner a drill signal is sounded, purely locally, in the building equipped with the signalling station. The switch MA (Figure 27), which is frequently connected to a municipal alarm box to actuate the latter, remains unactuated, as does also the break-glass switch 194, for during such a drill actuation of the station the lever 32 is left alone and hence switch MA remains unactuated and the glass rod remains unbroken. Non-interfering switch NI is actuated, however, remaining actuated from the moment that manual winding commences.

If it is desired to inspect the operation of the gear train, the casing structure is unfolded to bring it to the position shown in Figure 2 and, following the instructions on the casing 180 (Figure 12), the test knob or handle 165 that projects upwardly through the top wall of the transparent casing 180, and by which the test switch TP is actuated, is pushed and held away from the operator and hence toward the frame F (Figure 2), the key is inserted through the side aperture 180ᵉ and engaged in the hub of the gear of the gear train and turned, as above described in connection with the fire drill operation, but with the switch TP held as described, by way of the handle or knob 165, the circuits are rearranged so that though the code wheel 78 is driven and its switch SP operated, no alarm is transmitted or sounded; this is usually called a "silent" test, and the transparent casing permits the inspector to watch the mechanism in action. As indicated in Figure 12, the large letter "S" appears on the instructions to indicate the direction in which the knob 165 is pushed and held. By reference to Figure 27, the resultant position of the switch contacts of switch TP (pushed downwardly in Figure 27 for the silent test) closes a shunt around the switch SP at the second and third switch contacts of switch TP. Though non-interfering switch NI remains closed during the running of the gear train, its circuit remains open at the two lowermost contacts of switch TP which stand separated during the "silent" test.

If it is desired to test only the alarm circuit, the knob 165 of the switch TP is actuated forwardly (Figures 2 and 12), or toward the operator, and as a guide for that direction of movement the housing 180 bears the letter "A" (Figure 12) toward which the knob 165 is moved for the alarm test. That corresponds to an upward movement in Figure 27 and that effects a separation between the two uppermost switch contacts of switch TP, effecting a circuit interruption manually, just as switch SP when actuated by the code wheel 78 effects a circuit interruption to transmit a signal impulse.

In Figure 28 is diagrammatically indicated the circuit arrangement for a simpler electrical installation, illustratively one that requires only two terminal connectors in the terminal block, such as the terminal block 210ᵃ of Figures 23 and 24 above described. In Figure 28 terminal block 210ᵃ, with two binding posts, is indicated, in contrast to the terminal block 210ᵇ of Figure 27 where eight binding posts are utilized. In the installation of Figure 28 the internal circuit connections of the station are shown, with the station embodying the signal switch SP and because it does not embody a non-interfering switch NI, it has a simpler form of test switch TP as shown. In making up the signal station for Figure 28 the break-glass switch 194 is simply omitted from the assembly and if the break-glass deterrent is not desired, the glass rod G and the stirrups 183 and 184 (Figures 1 and 7) are simply omitted. The municipal signal switch MA is likewise omitted from the assembly. Alarm test and silent test are effected as before with this simple form of switch TP. An alarm test is effected by simply moving the knob 165 upwardly in Figure 28, opening the circuit for signal impulse transmission, while the switch SP remains closed. For silent test the knob 165 is pushed and held downwardly in Figure 28, thus shunting the switch SP so that the gear train mechanism can run and drive the code wheel 78 without signal transmission. For local fire drill the key is used to wind the spring of the gear train, the test switch knob 165 remaining in normal position; fire drill actuation is effected in this manner where the glass-breaking deterrent is employed across the lever 32 but where that is omitted, fire drill can be effected by simply pulling the lever 32 to effect local alarm transmission.

As above noted, the requirements to be met vary widely and as further illustrative of the adaptability of the above-described apparatus to meet these requirements, Figures 29 to 32 illustrate diagrammatically a few of these many other conditions to be met. In Figure 29 the system requirements are like those of Figure 28 except that a non-interfering switch NI is also required. In such case the switches TP, NI, and SP are interconnected, as is diagrammatically shown in Figure 29, and connected to a terminal block 210c provided with four binding posts and in that case the terminal block 210c is mounted on the brackets 214, 215 of Figure 16 after breaking off two scored sections from each bracket. In Figure 30 is indicated how still another requirement is met wherein the system of Figure 28 is to have also a general alarm key-operated switch 195 which in such case is assembled to the casing part C in the manner above described and as shown in Figures 1 and 5. Here, again, a four-terminal block 210c is used. Another installation might require in addition to the requirements of Figure 28 a break-glass switch 194 and a municipal connection switch MA, and in such case the circuit arrangement is as diagrammatically indicated in Figure 31 with a terminal block 210d having six binding posts, being secured to the brackets 214, 215 of the frame F of Figure 16 after three scored sections are broken off each bracket. Figure 32 further illustrates the wide adaptability of the apparatus, diagrammatically indicating a circuit arrangement utilizing a different type of switch SP according to the system requirements, other switching arrangements being now clearly understood in view of the description of other illustrative circuit arrangements. Also, it is to be understood that more than one toothed or code wheel and a corresponding number of coacting switches may be employed, according to the particular system requirement. It will also be understood that the instructions provided on the transparent casing 180 (Figure 12) are appropriately varied or changed according to the particular coacting assemblage and, therefore, that the instructions appearing in Figure 12 are merely illustrative.

It will thus be seen that there has been provided in this invention a construction for making electrical connections that is compact and efficient and well adapted to meet varying requirements of practical use in a thoroughly practical and advantageous manner. Moreover, it will be seen that the various objects and advantages heretofore pointed out or indicated are successfully achieved.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

We claim:

1. The steps in a method of making electrical terminal connections where the number of terminal connectors may vary, which comprise forming, in a support, two bracket arms that extend toward each other with a free space therebetween; forming, out of insulating material, an elongated connector block blank with a plurality of connector-element holes regularly spaced lengthwise thereof with upstanding transverse ribs projecting from the front face thereof and between successive holes; forming a plurality of holes in each of said two bracket arms with the holes spaced lengthwise thereof by the same spacing as the holes in said terminal block blank; cutting off said blank to the required length by transversely severing it along one of said transverse ribs that is spaced from the end of the blank by a number of said holes equal to the number of connector elements required plus 2; seating and securing connector elements in all of the holes of the severed portion excepting the end holes; severing one or both of the bracket arms between successive spaced holes therein to leave bracket end holes corresponding in spacing to the spacing of the end holes of the connector-element-carrying insulating block; and assembling the latter to said bracket arms by bringing their respective end holes into registry and securing them together at the respective registered end holes thereof.

2. The steps in a method of making electrical terminal connections where the number of terminal connectors may vary, which comprise forming, in a support, two bracket arms that extend toward each other with a free space therebetween; forming, out of insulating material, an elongated connector block blank with a plurality of connector-element holes regularly spaced lengthwise thereof with upstanding transverse ribs projecting from the front face thereof and between successive holes; forming a plurality of holes in each of said two bracket arms with the holes spaced lengthwise thereof by the same spacing as the holes in said terminal block blank; cutting off said blank to the required length by transversely severing it along one of said transverse ribs that is spaced from the end of the blank by a number of said holes equal to the number of connector elements required plus 2; seating and securing threaded bushings in all of the holes of the severed portion with sheet metal connector tabs secured at the back face by and at all of the bushings excepting those secured in the end holes for connection of conductors to said tabs, the tab-securing bushings having binding screws threaded into them from the front face for securing other conductors; severing one or both of the bracket arms between successive spaced holes therein to leave bracket end holes corresponding in spacing to the spacing of the end holes of the bushing-carrying insulating block; and assembling the latter to said bracket arms by bringing their respective end holes into registry and securing them together by screws threaded into the bushings in the end holes of the insulating block.

3. The steps in a method of making electrical terminal connections where the number of connectors may vary, which comprise forming, in a support, two spaced parts; forming, out of insulating material, an elongated terminal connector block blank with a plurality of connector-element holes regularly spaced lengthwise thereof with upstanding transverse ribs projecting from the front face thereof and between successive holes; forming a plurality of holes in at least one of said spaced parts with the holes spaced lengthwise thereof by the same spacing as the holes in said terminal block blank and forming at least one hole in the other of said spaced parts; cutting off said blank to the required length by transversely severing it along one of said transverse ribs that is spaced from the end of the blank by a number of said holes equal to the number of connector elements requires plus 2; seating and securing connector elements in all of the holes of the severed portion excepting the end holes; severing said first-mentioned spaced part between two holes therein to leave an end hole spaced from the hole in the other of said two spaced parts by a spacing corresponding to the spacing of the end holes of the connector-element-carrying insulating block; and assembling the latter to said two spaced parts by bringing their respective end holes into registry and securing them together at the respective registered end holes thereof.

4. The steps in a method of making electrical terminal connections where the number of terminal connectors may vary, which comprise forming, in a frame-like support adapted to rest against a supporting surface, two bracket arms that extend toward each other with a free space therebetween and the plane of which is displaced forwardly of the rear plane of said support; forming, out of insulating material, an elongated connector block blank with a plurality of connector-element holes regularly spaced lengthwise thereof with upstanding transverse ribs projecting from the front face thereof and between successive holes; forming a plurality of holes in each of said two bracket arms with the holes spaced lengthwise thereof by the same spacing as the holes in said terminal block blank; cutting off said blank to the required length by transversely severing it along one of said transverse ribs that is spaced from the end of the blank by a number of said holes equal to the number of connector elements required plus 2; seating and securing connector elements in all of the holes of the severed portion excepting the end holes; severing one or both of the bracket arms between successive spaced holes therein to leave bracket end holes corresponding in spacing to the spacing of the end holes of the connector-element-carrying insulating block; and assembling the latter to said bracket arms by bringing its end portions to rest against the rear faces of said bracket arms with said transverse ribs projecting forwardly of the plane of said bracket arms and with their respective end holes in registry, and securing them together at the respective registered end holes thereof.

5. The steps in a method of making electrical terminal connections where the number of terminal connectors may vary, which comprise forming, out of sheet metal, a four-sided supporting frame by cutting and bending rearwardly two opposed parallel flanges of the same length as the length of the respective lines about which they are bent and by cutting and bending rearwardly at the remaining two opposed sides two parallel flanges each of which, at least at one end of said frame, is longer than the respective lines about which they are bent by an amount substantially the same as the depth of said flanges thereby to provide securing ears at at least one end of said frame; stamping out a portion of the sheet metal between two opposed flanged sides of said frame to provide an opening-like free space therebetween and to form opposed spaced supporting portions of which at least one extends toward the other; forming a plurality of spaced holes in said one supporting portion which are spaced in the direction toward the other supporting portion; bridging an elongated insulating block carrying conductor-connector elements, which block has a length substantially proportional to the number of said connector elements, across said free space; severing said one supporting portion between two successive holes therein to provide a spacing between its end and the opposed supporting portion that is substantially proportional to the length of said insulating block; and securing the block to said opposed supporting portions with the block extending rearwardly into the space peripherally encompassed by said rearwardly extending flanges and with one end of the block secured at the endmost hole of the severed one of said opposed supporting portions.

6. The steps in a method of making electrical terminal connections where the number of terminal connectors may vary, which comprise forming, in a support, two spaced parts; forming, out of insulating material, an elongated terminal connector block blank with a plurality of connector-element holes regularly spaced lengthwise thereof; forming a plurality of holes in at least one of said spaced parts with the holes spaced lengthwise thereof by the same spacing as the holes in said terminal block blank; cutting off said blank to the required length by severing it transversely between two successive holes so as to leave at least one more hole than the number of required connector elements; seating and securing connector elements in all of the holes of the severed portion excepting at least one hole at one end to form a terminal connector block; severing said first mentioned spaced part between two holes therein if and as needed, according to the length of said connector block, to leave an end hole spaced from the other of said two spaced parts which will align with said one end hole in said insulating block when the latter is bridged across said two spaced parts; and assembling the connector-element-carrying insulating block to said two spaced parts by bringing said two end holes into registry and thereat securing that end of the block to that spaced part and securing the other end of the insulating block to the other of said two spaced parts.

7. A device for making electrical terminal connections comprising a support having two bracket arms that extend toward each other with a free space therebetween for supporting across the latter an elongated terminal connector block that has a plurality of holes regularly spaced lengthwise thereof with upstanding transverse ribs projecting from the front face of the block and between successive holes, each of said bracket arms having therein a plurality of holes spaced lengthwise thereof by the same spacing as the holes of said terminal block, said bracket arms being severable transversely between successive holes therein, a terminal connector block with spaced holes and intervening transverse ribs therein as aforesaid with the number of holes equal to the number of conductor-connector elements required plus 2 and with connector elements in all of the holes excepting the end holes whereby the latter are registrable with holes in said two bracket arms which, if and as needed by the required length of the terminal connector block, are severed so that the registering holes of said bracket arms are end holes therein, and securing means coacting with said bracket arms and said terminal connector block at the respectively registering end holes thereof for holding said block in place.

8. A device for making electrical terminal connections comprising a support having two bracket arms that extend toward each other with a free space therebetween for supporting across the latter an elongated terminal connector block that has a plurality of holes regularly spaced lengthwise thereof with upstanding transverse ribs projecting from the front face of the block and between successive holes, each of said bracket arms having therein a plurality of holes spaced lengthwise thereof by the same spacing as the holes of said terminal block, said bracket arms being severable transversely between successive holes therein, a terminal connector block with spaced holes and intervening transverse ribs therein as aforesaid with the number of holes equal to the number of conductor-connector elements required plus 2 and with threaded bushings secured in all of the holes of the terminal block with sheet metal connector tabs secured at the back face by and at all of the bushings excepting those bushings secured in the end holes whereby conductors may be connected to said tabs, said tab-securing bushings having binding screws threaded into them from the front face for securing other conductors thereto, said threaded bushings in said end holes registering with spaced holes in said two bracket arms which, if and as needed by the required length of the terminal block, are severed so that the registering holes of said bracket arms are end holes therein that correspond in spacing to the spacing of said tab-less bushings in the end holes of said block, and screws passed through said end bracket arm holes and threaded into the bushings in the end holes of the connector block for securing the latter in place.

9. A device for making electrical terminal connections comprising a support having two spaced parts for supporting across the latter an elongated terminal connector block that has a plurality of holes regularly spaced lengthwise thereof with upstanding transverse ribs projecting from the front face of the block and between successive holes, one of said spaced parts having at least one hole and the other having a plurality of holes spaced lengthwise thereof with all of the holes of the same spacing as the holes in said terminal block, said other spaced part being severable transversely between successive holes therein, a terminal connector block with spaced holes and intervening transverse ribs therein as aforesaid with the number of holes equal to the number of conductor-connector elements required plus 2 and with connector elements in all of the holes excepting the end holes whereby the latter are registrable with holes in said two spaced parts of which the one that has a plurality of spaced holes is severed if and as needed by the required length of the terminal connector block so that the registering holes of said two spaced parts are end holes therein, and securing means coacting with said two spaced parts and said terminal connector block at the respectively registering end holes thereof for holding said block in place.

10. A device for making electrical terminal connections comprising a frame-like support adapted to rest against a supporting surface and having two bracket arms that extend toward each other with a free space therebetween and the plane of which is displaced forwardly of the rear plane of said support for supporting thereacross an elongated terminal connector block that has a plurality of connector-element holes regularly spaced lengthwise thereof with upstanding transverse ribs projecting from the front face thereof and between successive holes, each of said bracket arms having therein a plurality of holes spaced lengthwise thereof by the same spacing as the holes in said terminal block, said bracket arms being severable transversely between successive holes therein, a terminal connector block with spaced holes and intervening transverse ribs therein as aforesaid with the number of holes equal to the number of connector elements required plus 2 and with connector elements in all of the holes excepting the end holes whereby the latter are registrable with holes in said two bracket arms which, if and as needed by the required length of the terminal connector block, are severed so that the registering holes of said bracket arms are end holes therein, the respective end portions of said terminal block resting against the respective rear faces of said bracket arms with said transverse ribs projecting forwardly of the plane of said bracket arms, and securing means coacting with said bracket arms and said terminal connector block at the respectively registering end holes thereof for holding said block in place.

11. A device for making electrical terminal connections comprising a sheet metal four-sided supporting frame having two rearwardly bent opposed parallel flanges of the same length as the length of the respective lines about which they are bent and having at the remaining two opposed sides two rearwardly bent parallel flanges each of which, at least at one end of said frame, is longer than the respective lines about which they are bent by an amount substantially the same as the depth of said flanges thereby to provide securing ears at at least one end of said frame, a portion of the sheet metal of the frame between opposed flanged sides of said frame being stamped out to provide an opening-like free space therebetween and to leave opposed spaced supporting portions of which at least one extends into said free space and toward the other, said one supporting portion having a plurality of holes therein spaced in the direction toward the other supporting portion, an elongated insulating block carrying conductor-connector elements and having a length substantially proportional to the number of said connector elements, said block being bridged across said opposed spaced supporting portions and extending rearwardly into the space peripherally encompassed by said rearwardly extending flanges and said one supporting portion being, if and as needed by the required length of the insulating block, severed between two successive holes therein so that the end hole therein registers with an end of the insulating block, securing means coacting between said end hole and said last mentioned end of the insulating block for securing the latter to said one supporting portion, and means for securing the other end of the insulating block to the other supporting portion.

12. A device for making electrical terminal connections comprising a sheet metal four-sided supporting frame having two rearwardly bent opposed parallel flanges of the same length as the length of the respective lines about which they are bent and having at the remaining two opposed sides two rearwardly bent parallel flanges each of which, at least at one end of said frame, is longer than the respective lines about which they are bent by an amount substantially the same as the depth of said flanges thereby to provide securing ears at at least one end of said frame, a portion of the sheet metal of the frame between opposed flanged sides of said frame being stamped out to provide opposed supporting portions with a free space therebetween, said supporting portions falling in a plane that is spaced forwardly of the plane of the back edges of said rearwardly bent flanges, and a connector block having spaced front and rear conductor-connector elements of which the front connector elements are separated by forwardly projecting transverse ribs, said connector block being seated with the front end portions against the rear faces of its end portions, with means securing said end portions of the terminal block to said spaced support portions.

13. A device for making electrical terminal connections comprising a sheet metal plate-like support adapted to be secured across the front open end of an outlet box for circuit conductors and having a relatively large T-shaped opening therein adapted to overlie the open front of the outlet box, said plate-like support having two spaced bracket arms extending toward each other and respectively from the ends of the cross portion of said T-shaped opening, said bracket arms having secured thereto an elongated insulating terminal connector block that is thereby bridged across said cross portion of the T-shaped opening and leaves the remainder of the latter unobstructed, said terminal connector block having a plurality of spaced conductor-connector elements and said sheet metal plate-like support having cut and bent out of its plane and adjacent an end thereof at least two spaced parallel ears with coaxial holes therein, a housing-like cover over the front of said plate-like support and encompassing said spaced ears with a wall of said cover provided with spaced slots to respectively accommodate said spaced ears, and means coacting between said slotted wall portions and the holes of said ears for pivotally connecting said cover and said plate-like support.

14. A device for making electrical terminal connections comprising a support having two bracket arms that extend toward each other with a free space therebetween for supporting across the latter an elongated terminal connector block that has a plurality of holes regularly spaced lengthwise thereof with upstanding transverse ribs projecting from the front face of the block and between successive holes, each of said bracket arms having therein a plurality of holes spaced lengthwise thereof by the same spacing as the holes of said terminal block, said bracket arms being severable transversely between successive holes therein, a terminal connector block with spaced holes and intervening transverse ribs therein as aforesaid with the number of holes equal to the number of conductor-connector elements required plus 2 and with connector elements in all of the holes excepting the end holes whereby the latter are registrable with holes in said two bracket arms which, if and as needed by the required length of the terminal connector block, are severed so that the registering holes of said bracket arms are end holes therein, a shield of insulating material overlying said transverse ribs to cover over the connector elements between successive ribs, said shield being of a length to overlie the longest terminal connector block supportable by said bracket arms, securing means coacting with said bracket arms and said terminal connector block at the respectively registering end holes thereof for holding said block in place, and means movably supporting said shield and engaging it at its end portions at locations substantially coincident with those holes in said bracket arms that are most remote from the free ends thereof.

15. A device as claimed in claim 14 in which the two shield-supporting engaging means are associated respectively with the securing means at the respective ends of said terminal block where the latter is of maximum length that can be accommodated by said bracket arms.

16. A device as claimed in claim 14 in which the two shield-supporting engaging means are associated with and mounted in said respective most remote bracket holes where the terminal connector block is shorter than the longest block that can be accommodated by said two bracket arms.

17. A device for making electrical terminal connections comprising a support having two bracket arms that extend toward each other with a free space therebetween for supporting across the latter an elongated terminal connector block that has a plurality of holes regularly spaced lengthwise thereof with upstanding transverse ribs projecting from the front face of the block and between successive holes, each of said bracket arms having therein a plurality of holes spaced lengthwise thereof by the same spacing as the holes of said terminal block, said bracket arms being severable transversely between successive holes therein, a terminal connector block with spaced holes and intervening transverse ribs therein as aforesaid with the number of holes equal to the number of conductor-connector elements required plus 2 and with threaded bushings secured in all of the holes of the terminal block with sheet metal connector tabs secured at the back face by and at all of the bushings excepting those bushings secured in the end holes whereby conductors may be connected to said tabs, said tab-securing bushings having binding screws threaded into them from the front face for securing other conductors thereto, said threaded bushings in said end holes registering with spaced holes in said two bracket arms which, if and as needed by the required length of the terminal block, are severed so that the registering holes of said bracket arms are end holes therein that correspond in spacing to the spacing of said tab-less bushings in the end holes of said block, an insulating shield overlying said transverse ribs to cover over the conductor-connector elements between successive ribs, said shield being of a length to cover the longest terminal block to which said bracket arms can be accommodated, threaded means passed through said end bracket holes and threaded into the bushings in the end holes of the connector block for securing the latter in place, and means movably supporting said shield and engaging it at end portions thereof at locations respectively substantially coincident with those bracket arm holes that are respectively most remote from the free ends of the bracket arms.

18. A device as claimed in claim 17 in which the two shield supporting and engaging means respectively comprise said threaded means that secure said terminal block to said bracket arms where the terminal block is the longest which said bracket arms can accommodate.

19. A device as claimed in claim 17 in which, where the terminal connector block is shorter than the longest that can be accommodated by said bracket arms, said two shield supporting and engaging means comprise threaded means coacting with and supported in said respective most remote holes.

20. A device for making electrical terminal connections comprising a support having two spaced parts for supporting across the latter an elongated terminal connector block that has a plurality of holes regularly spaced lengthwise thereof with upstanding transverse ribs projecting from the front face of the block and between successive holes, one of said spaced parts having at least one hole and the other having a plurality of holes spaced lengthwise thereof with all of the holes of the same spacing as the holes in said terminal block, said other spaced part being severable transversely between successive holes therein, a terminal connector block with spaced holes and intervening transverse ribs therein as aforesaid with the number of holes equal to the number of conductor-connector elements required plus 2 and with connector elements in all of the holes excepting the end holes whereby the latter are registrable with holes in said two spaced parts of which the one that has a plurality of spaced holes is severed if and as needed by the required length of the terminal connector block so that the registering holes of said two spaced parts are end holes therein, an insulating shield overlying said transverse ribs to cover over the connector elements between successive ribs, said shield being of a length to cover the longest terminal block that can be accommodated by said two spaced parts, securing means coacting with said two spaced parts and said terminal block at the respectively registering end holes thereof for holding said block in place, and means movably supporting said insulating shield in a position to overlie whatever length of terminal block is accommodated by said two spaced parts.

21. A device for making electrical terminal connections comprising a support having two spaced parts for supporting across the latter an elongated terminal connector block that has a plurality of holes regularly spaced lengthwise thereof, one of said spaced parts having a plurality of holes spaced lengthwise thereof by the same spacing as the holes in said terminal block, a terminal connector block with spaced holes therein as aforesaid with the number of holes equal to the number of conductor-connector elements required plus 1 and with conductor-connector elements in all of the holes excepting an end hole, said terminal connector block being bridged across said two spaced parts of which the one that has said plurality of spaced holes is severed if and as needed by the required length of the terminal connector block so that said end hole thereof registers with the end hole of said one spaced part, securing means at said registered end holes for securing that end of the terminal block thereat, and means for securing the other end of the terminal connector block to the other of said spaced parts.

22. A device for making electrical terminal connections comprising a support having two spaced parts for supporting across the latter an elongated terminal connector block that has a plurality of holes regularly spaced lengthwise thereof, one of said spaced parts having at least one hole and the other having a pluraltiy of holes spaced lengthwise thereof with all of the holes of the same spacing as the holes in said terminal block, said other spaced part being severable transversely between successive holes therein, a terminal connector block with spaced holes therein as aforesaid with the number of holes equal to the number of conductor-connector elements required plus 2 and with connector elements in all of the holes excepting the end holes whereby the latter are registrable with holes in said two spaced parts of which the one that has a plurality of spaced holes is severed if and as needed by the required length of the terminal connector block so that the registering holes of said two spaced parts are end holes therein, and securing means coacting with said two spaced parts and said terminal block at the respectively registering end holes thereof for holding said block in place.

23. A device for making electrical terminal connections comprising a support having two spaced parts for supporting across the latter an elongated terminal connector block that has a plurality of holes regularly spaced lengthwise thereof, one of said spaced parts having at least one hole and the other having a plurality of holes spaced lengthwise thereof with all of the holes of the same spacing as the holes in said terminal block, said other spaced part being severable transversely between successive holes therein, a terminal connector block with spaced holes therein as aforesaid with the number of holes equal to the number of conductor-connector elements required plus 2 and with connector elements in all of the holes excepting the end holes whereby the latter are registrable with holes in said two spaced parts of which the one that has a plurality of spaced holes is severed if and as needed by the required length of the terminal connector block so that the registering holes of said two spaced parts are end holes therein, an insulating shield overlying said connector block to cover over the connector elements thereof, said shield being of a length to cover the longest terminal block that can be accommodated by said two spaced parts, securing means coacting with said two spaced parts and said terminal block at the respectively registering end holes thereof for holding said block in place, and means movably supporting said insulating shield in a position to overlie whatever length of terminal block is accommodated by said two spaced parts.

References Cited in the file of this patent

UNITED STATES PATENTS

| Number | Name | Date |
|---|---|---|
| 1,628,406 | Horton | May 10, 1927 |
| 1,734,594 | Molloy | Nov. 5, 1929 |
| 1,847,897 | Pratt | Mar. 1, 1932 |
| 1,862,811 | Strong | June 14, 1932 |
| 1,923,939 | Lavarack | Aug. 22, 1933 |
| 2,431,999 | Engelhardt | Dec. 2, 1947 |